United States Patent
Arutyunov et al.

(10) Patent No.: US 7,072,337 B1
(45) Date of Patent: Jul. 4, 2006

(54) SYSTEM AND METHOD FOR RESOLVING NETWORK ADDRESSES FOR NETWORK DEVICES ON DISTRIBUTED NETWORK SUBNETS

(75) Inventors: Yuri Arutyunov, Barrington, IL (US);
John G. Fijolek, Naperville, IL (US);
Ronald Lee, Northbrook, IL (US);
William Necka, Bloomingdale, IL (US)

(73) Assignee: 3Com Corporation, Marlborough, MA (US)

( * ) Notice: Subject to any disclaimer, the term of this patent is extended or adjusted under 35 U.S.C. 154(b) by 947 days.

(21) Appl. No.: 10/056,886

(22) Filed: Jan. 25, 2002

(51) Int. Cl.
*H04L 12/28* (2006.01)
*H04L 12/56* (2006.01)
*G06F 15/16* (2006.01)

(52) U.S. Cl. .................. 370/389; 709/245; 370/401
(58) Field of Classification Search ................ 370/312, 370/352, 389, 392, 400–401, 409, 432, 475; 709/223, 245
See application file for complete search history.

(56) References Cited

U.S. PATENT DOCUMENTS

| | | | |
|---|---|---|---|
| 4,644,533 A | 2/1987 | Braff et al. | 370/94 |
| 4,881,263 A | 11/1989 | Herbison et al. | 380/21 |
| 4,996,685 A | 2/1991 | Farese et al. | 370/58.1 |
| 5,014,234 A | 5/1991 | Edwards, Jr. | 364/900 |
| 5,138,712 A | 8/1992 | Corbin | 395/700 |
| 5,301,273 A | 4/1994 | Konishi | 395/200 |
| 5,347,304 A | 9/1994 | Moura et al. | 348/12 |
| 5,430,727 A | 7/1995 | Callon | 370/85.13 |
| 5,442,749 A | 8/1995 | Northcutt et al. | 395/200.09 |
| 5,488,412 A | 1/1996 | Majeti et al. | 348/10 |
| 5,489,897 A | 2/1996 | Inoue | 340/870.39 |
| 5,528,595 A | 6/1996 | Walsh et al. | 370/85.13 |
| 5,583,931 A | 12/1996 | Schneider et al. | 379/399 |
| 5,586,121 A | 12/1996 | Moura et al. | 370/404 |
| 5,598,410 A | 1/1997 | Stone | 370/469 |

(Continued)

FOREIGN PATENT DOCUMENTS

WO WO 00/67385 11/2000

OTHER PUBLICATIONS

"Cable Modem to Customer Premise Equipment Interface Specification (Interim) SP-CMCI-I02-980317", Multimedia Cable Network Systems (MCNS) Holdings, L.P., Cable Television Laboratories, Inc., 1998, pp. ii to 40.

(Continued)

*Primary Examiner*—Chau Nguyen
*Assistant Examiner*—Kerri M. Dyke
(74) *Attorney, Agent, or Firm*—McDonnell Boehnen Hulbert & Berghoff LLP

(57) ABSTRACT

A system and methods for traffic gating in a computer network comprising a plurality of subnets are developed. One of the methods implemented in a data-over-cable system includes, responsive to receiving a first address resolution request message on a cable modem from a first host to a second host, generating a second address resolution request message on the cable modem and sending it to the second host. If the second host does not respond with an address resolution protocol reply message to the second request message, the cable modem determines a network subnet associated with the first host. Based on the network subnet, the cable modem determines a network address of a network element arranged to provide routing services to hosts on the subnet associated with the first host. Next, the cable modem generates an address resolution reply message including the network address of the network element and sends it to the first host.

24 Claims, 25 Drawing Sheets

U.S. PATENT DOCUMENTS

| | | | |
|---|---|---|---|
| 5,600,717 A | 2/1997 | Schneider et al. | 379/399 |
| 5,606,606 A | 2/1997 | Schneider et al. | 379/399 |
| 5,608,446 A | 3/1997 | Carr et al. | 348/6 |
| 5,610,910 A | 3/1997 | Focsaneanu et al. | 370/351 |
| 5,623,542 A | 4/1997 | Schneider et al. | 379/399 |
| 5,623,601 A | 4/1997 | Vu | 395/187.01 |
| 5,636,211 A | 6/1997 | Newlin et al. | 370/465 |
| 5,675,732 A | 10/1997 | Majeti et al. | 395/200.01 |
| 5,675,742 A | 10/1997 | Jain et al. | 395/200 |
| 5,678,041 A | 10/1997 | Baker et al. | 395/609 |
| 5,708,654 A | 1/1998 | Arndt et al. | 370/242 |
| 5,710,885 A | 1/1998 | Bondi | 395/200.54 |
| 5,724,510 A | 3/1998 | Arndt et al. | 395/200.5 |
| 5,761,602 A | 6/1998 | Wagner et al. | 344/3.1 |
| 5,778,181 A | 7/1998 | Hidary et al. | 395/200.48 |
| 5,784,597 A | 7/1998 | Chiu et al. | 395/552 |
| 5,790,198 A | 8/1998 | Roop et al. | 348/460 |
| 5,790,548 A | 8/1998 | Sistanizadeh et al. | 370/401 |
| 5,790,677 A | 8/1998 | Fox et al. | 380/24 |
| 5,790,770 A | 8/1998 | McClure et al. | 395/200.61 |
| 5,790,806 A | 8/1998 | Koperda | 395/200.82 |
| 5,793,747 A | 8/1998 | Kline | 370/230 |
| 5,799,086 A | 8/1998 | Sudia | 380/23 |
| 5,805,804 A | 9/1998 | Laursen et al. | 395/200.02 |
| 5,809,252 A | 9/1998 | Beighe et al. | 395/200.57 |
| 5,812,819 A | 9/1998 | Rodwin et al. | 395/500 |
| 5,815,664 A | 9/1998 | Asano | 395/200.57 |
| 5,818,845 A | 10/1998 | Moura et al. | 370/449 |
| 5,819,028 A | 10/1998 | Manghirmalani et al. | 395/185.1 |
| 5,819,042 A | 10/1998 | Hansen | 395/200.52 |
| 5,828,655 A | 10/1998 | Moura et al. | 370/236 |
| 5,828,666 A | 10/1998 | Focsaneanu et al. | 370/389 |
| 5,835,720 A | 11/1998 | Nelson et al. | 395/200.54 |
| 5,835,727 A | 11/1998 | Wong et al. | 395/200.68 |
| 5,841,777 A | 11/1998 | Cohen | 370/433 |
| 5,848,233 A | 12/1998 | Radia et al. | 395/187.01 |
| 5,852,721 A | 12/1998 | Dillon et al. | 395/200.47 |
| 5,854,901 A | 12/1998 | Cole et al. | 709/245 |
| 5,859,852 A | 1/1999 | Moura et al. | 370/449 |
| 5,864,679 A | 1/1999 | Kanai et al. | 709/238 |
| 5,870,134 A | 2/1999 | Laubach et al. | 348/12 |
| 5,872,523 A | 2/1999 | Dellaverson et al. | 340/825.52 |
| 5,884,024 A | 3/1999 | Lim et al. | 395/187.01 |
| 5,892,754 A | 4/1999 | Kompella et al. | 370/236 |
| 5,894,479 A | 4/1999 | Mohammed | 370/401 |
| 5,903,558 A | 5/1999 | Jones et al. | 370/351 |
| 5,909,549 A | 6/1999 | Compliment et al. | 709/223 |
| 5,913,037 A | 6/1999 | Spofford et al. | 395/200.56 |
| 5,915,119 A | 6/1999 | Cone | 395/750.02 |
| 5,922,049 A | 7/1999 | Radia et al. | 709/220 |
| 5,922,051 A | 7/1999 | Sidey | 709/223 |
| 5,923,659 A | 7/1999 | Curry et al. | 370/401 |
| 5,926,458 A | 7/1999 | Yin | 370/230 |
| 5,929,850 A | 7/1999 | Broadwin et al. | 345/327 |
| 5,941,988 A | 8/1999 | Bhagwat et al. | 713/201 |
| 5,943,604 A | 8/1999 | Chen et al. | 455/5.1 |
| 5,954,797 A | 9/1999 | Sidey | 709/223 |
| 5,958,007 A | 9/1999 | Lee et al. | 709/219 |
| 5,960,177 A | 9/1999 | Tanno | 395/200.59 |
| 5,974,453 A | 10/1999 | Anderson et al. | 709/220 |
| 5,982,748 A | 11/1999 | Yin et al. | 370/232 |
| 5,987,524 A | 11/1999 | Yoshida et al. | 709/245 |
| 5,991,292 A | 11/1999 | Focsaneanu et al. | 370/352 |
| 5,991,306 A | 11/1999 | Burns et al. | 370/429 |
| 5,996,076 A | 11/1999 | Rowney et al. | 713/201 |
| 5,999,536 A | 12/1999 | Kawafuji et al. | 370/401 |
| 6,003,077 A | 12/1999 | Bawden et al. | 709/223 |
| 6,005,851 A | 12/1999 | Craddock et al. | 370/329 |
| 6,006,264 A | 12/1999 | Colby et al. | 709/226 |
| 6,009,103 A | 12/1999 | Woundy | 370/401 |
| 6,012,088 A | 1/2000 | Li et al. | 709/219 |
| 6,013,107 A | 1/2000 | Blackshear et al. | 703/229 |
| 6,014,545 A | 1/2000 | Wu et al. | 455/3.1 |
| 6,018,767 A | 1/2000 | Fijolek et al. | 709/218 |
| 6,031,841 A | 2/2000 | Woundy | 370/410 |
| 6,032,019 A | 2/2000 | Chen et al. | 455/5.1 |
| 6,041,041 A | 3/2000 | Ramanathan et al. | 370/241 |
| 6,046,979 A | 4/2000 | Bauman | 370/229 |
| 6,049,546 A | 4/2000 | Ramakrishnan | 370/412 |
| 6,049,825 A | 4/2000 | Yamamoto | 709/221 |
| 6,049,826 A | 4/2000 | Beser | 709/222 |
| 6,052,724 A | 4/2000 | Willie et al. | 709/223 |
| 6,058,421 A | 5/2000 | Fijolek et al. | 709/225 |
| 6,061,349 A | 5/2000 | Coile et al. | 370/389 |
| 6,064,372 A | 5/2000 | Kahkoska | 345/173 |
| 6,065,049 A | 5/2000 | Beser | 709/218 |
| 6,070,187 A | 5/2000 | Subramaniam et al. | 709/220 |
| 6,070,242 A | 5/2000 | Wong et al. | 713/201 |
| 6,070,246 A | 5/2000 | Beser | 713/201 |
| 6,073,178 A | 6/2000 | Wong et al. | 709/229 |
| 6,075,787 A | 6/2000 | Bobeck et al. | 370/395 |
| 6,091,709 A | 7/2000 | Harrison et al. | 370/235 |
| 6,094,431 A | 7/2000 | Yamato et al. | 370/395 |
| 6,104,700 A | 8/2000 | Haddock et al. | 370/235 |
| 6,112,258 A | 8/2000 | Miller et al. | 710/19 |
| 6,122,254 A | 9/2000 | Aydemir et al. | 370/235 |
| 6,128,298 A | 10/2000 | Wootton et al. | 370/392 |
| 6,130,879 A | 10/2000 | Liu | 370/230 |
| 6,130,880 A | 10/2000 | Naudus et al. | 370/235 |
| 6,137,792 A | 10/2000 | Jonas et al. | 370/354 |
| 6,137,793 A | 10/2000 | Gorman et al. | 370/360 |
| 6,148,410 A | 11/2000 | Baskey et al. | 714/4 |
| 6,157,965 A | 12/2000 | Mohammed et al. | 710/8 |
| 6,170,061 B1 | 1/2001 | Beser | 713/201 |
| 6,175,867 B1 * | 1/2001 | Taghadoss | 709/229 |
| 6,178,455 B1 | 1/2001 | Schutte et al. | 709/228 |
| 6,185,624 B1 | 2/2001 | Fijolek et al. | 709/239 |
| 6,189,102 B1 | 2/2001 | Beser | 713/201 |
| 6,208,656 B1 | 3/2001 | Hrastar et al. | 370/401 |
| 6,212,563 B1 | 4/2001 | Beser | 709/227 |
| 6,216,171 B1 | 4/2001 | Isono et al. | 709/250 |
| 6,223,222 B1 | 4/2001 | Fijolek et al. | 709/227 |
| 6,240,464 B1 | 5/2001 | Fijolek et al. | 709/250 |
| 6,243,369 B1 | 6/2001 | Grimwood et al. | 370/335 |
| 6,260,072 B1 | 7/2001 | Rodriguez-Moral | 709/241 |
| 6,269,099 B1 | 7/2001 | Borella et al. | 370/389 |
| 6,272,150 B1 | 8/2001 | Hrastar | 370/486 |
| 6,275,853 B1 | 8/2001 | Beser et al. | 709/223 |
| 6,289,377 B1 | 9/2001 | Lalwaney et al. | 709/222 |
| 6,295,554 B1 | 9/2001 | Karadogan | 709/219 |
| 6,301,223 B1 | 10/2001 | Hrastar et al. | 370/227 |
| 6,301,618 B1 | 10/2001 | Sitaraman et al. | 709/227 |
| 6,308,328 B1 | 10/2001 | Bowcutt et al. | 725/111 |
| 6,331,987 B1 | 12/2001 | Beser | 370/486 |
| 6,332,163 B1 | 12/2001 | Bowman-Amuah | 709/231 |
| 6,337,858 B1 | 1/2002 | Petty et al. | 370/356 |
| 6,351,773 B1 | 2/2002 | Fijolek et al. | 709/228 |
| 6,370,147 B1 | 4/2002 | Beser | 370/401 |
| 6,393,478 B1 | 5/2002 | Bahlmann | 709/224 |
| 6,442,158 B1 | 8/2002 | Beser | 370/352 |
| 6,449,291 B1 | 9/2002 | Burns et al. | 370/516 |
| 6,453,472 B1 | 9/2002 | Leano et al. | 725/111 |
| 6,490,727 B1 | 12/2002 | Nazarathy et al. | 725/129 |
| 6,510,162 B1 | 1/2003 | Fijolek et al. | 370/432 |
| 6,738,828 B1 * | 5/2004 | Keats et al. | 709/245 |
| 6,775,713 B1 * | 8/2004 | Liu et al. | 709/250 |
| 6,895,443 B1 * | 5/2005 | Aiken | 709/245 |
| 2002/0122050 A1 | 9/2002 | Sandberg | 345/705 |
| 2002/0136165 A1 | 9/2002 | Ady et al. | 370/241 |
| 2003/0028891 A1 | 2/2003 | Hardt et al. | 725/107 |
| 2003/0069955 A1 * | 4/2003 | Gieseke et al. | 709/223 |

OTHER PUBLICATIONS

"Operations Support System Interface Specification Baseline Privacy Interface MIB (Interim Specification) SP-OSSI-BPI-I01-980331", MCNS Holdings, L.P., 1997 and 1998, pp. ii to 33.

"Cable Modem Termination System-Network Side Interface Specification (Interim Specification) SP-CMTS-NSII01-960702", MCNS Holdings, L.P., 1996, pp. ii to 13.

"Removable Security Module Interface Specification (Interim Specification) SP-RSMI-I01-980204", MCNS Holdings, L.P., Cable Television Laboratories, Inc., 1997, pp. ii to 47.

"Baseline Privacy Interface Specification (Interim) SP-BPI-I01-970922", MCNS Holdings, L.P., 1997, pp. ii to 65.

"Operations Support System Interface Specification (Interim) SP-OSSII01-970403", MCNS Holdings, L.P., 1997, pp. 1 to 30.

"Radio Frequency Interface Specification (Interim Specification) SP-RFI-I02-971008", MCNS Holdings, L.P., 1997, pp. ii to 186.

"Cable Modem Telephony Return Interface Specification (Interim) SP-CMTRI-I01-970804", MCNS Holdings, L.P., Cable Television Laboratories, Inc., 1997, pp. ii to 73.

"Security System Specification (Interim Specification) SP-SSI-I01-970506", MCNS Holdings, L.P., 1997, pp. ii to 103.

"Internet Engineering Task Force", Request for Comments 2131, Dynamic Host Configuration Protocol (DHCP), Mar. 1997, pp. 1 to 42.

S. Adiraju, J. Fijolek, IPCDN Telephony Return MIB, Internet Engineering Task Force, Internet Draft, "<draft-ietf-ipcdn-tri-mib-00.1.txt>," Mar. 1998, pp. 1 to 26.

Kyees, P.J. et al., *ADSL: A New Twisted-Pair Access to the Information Highway*, IEEE Communications Magazine, vol. 33, Issue 4, Apr. 1995, pp. 52-60.

Huang, Yin-Hwa et al., *Design of an MPEG-Based Set-Top Box for Video on Demand Services*, Acoustics, Speech, and Signal Processing, 1995, ICASSP-95., 1995 International Conference, vol. 4, ISBN: 0-7803-2431-5, May 9-12, 1995, pp. 2655-2658.

"A Solution for the Priority Queue Problem of Deadline-Ordered Service Disciplines," N.R. Figueira, IEEE International Conference on Computer Communications and Networks, Sep. 22-25, 1997, pp. 320-325.

"Radio Frequency Interface Specification (Interim Specification) SP-RFI-I04-980724", MCNS Holdings, L.P., 1997, pp. ii to 196.

"Radio Frequency Interface Specification (Interim Specification) SP-RFI-I05-991105", MCNS Holdings, L.P., 1999, pp. Ii to 202.

"Radio Frequency Interface Specification (Interim Specification) SP-RFIv1.1-I06-001215", MCNS Holdings, L.P., 2000, pp. ii to 432.

Droms, R., *Dynamic Host Configuration Protocol*, Request for Comments 1541, Oct. 1993, pp. 1 to 31.

RFC 791, *Internet Protocol, DARPA Internet Program Protocol Specification*, Sep. 1981, pp. 1-37.

Postel, J., *Internet Protocol, DARPA Internet Program Protocol Specification*, RFC 792, Sep. 1981, pp. 1-14.

Postel, J., *User Datagram Protocol*, RFC 768, Aug. 28, 1980, pp. 1-3.

RFC 793, *Transmission Control Protocol, DARPA Internet Program Protocol Specification*, Sep. 1981, pp. 1-68.

Case, J. et al., *A Simple Network Management Protocol (SNMP)*, RFC 1157, May 1990, pp. 1-26.

Sollins, K., *The TFTP Protocol (Revision 2)*, RFC 1350, Jul. 1992, pp. 1-9.

Alexander, S., *DHCP Options and BOOTP Vendor Extensions*, RFC 2132, Mar. 1997, pp. 1-27.

"Radio Frequency Interface Specification (Interim Specification) SP-RFIv1.1-I03-991105", MCNS Holdings, L.P., 1999, pp. Ii to 366.

* cited by examiner

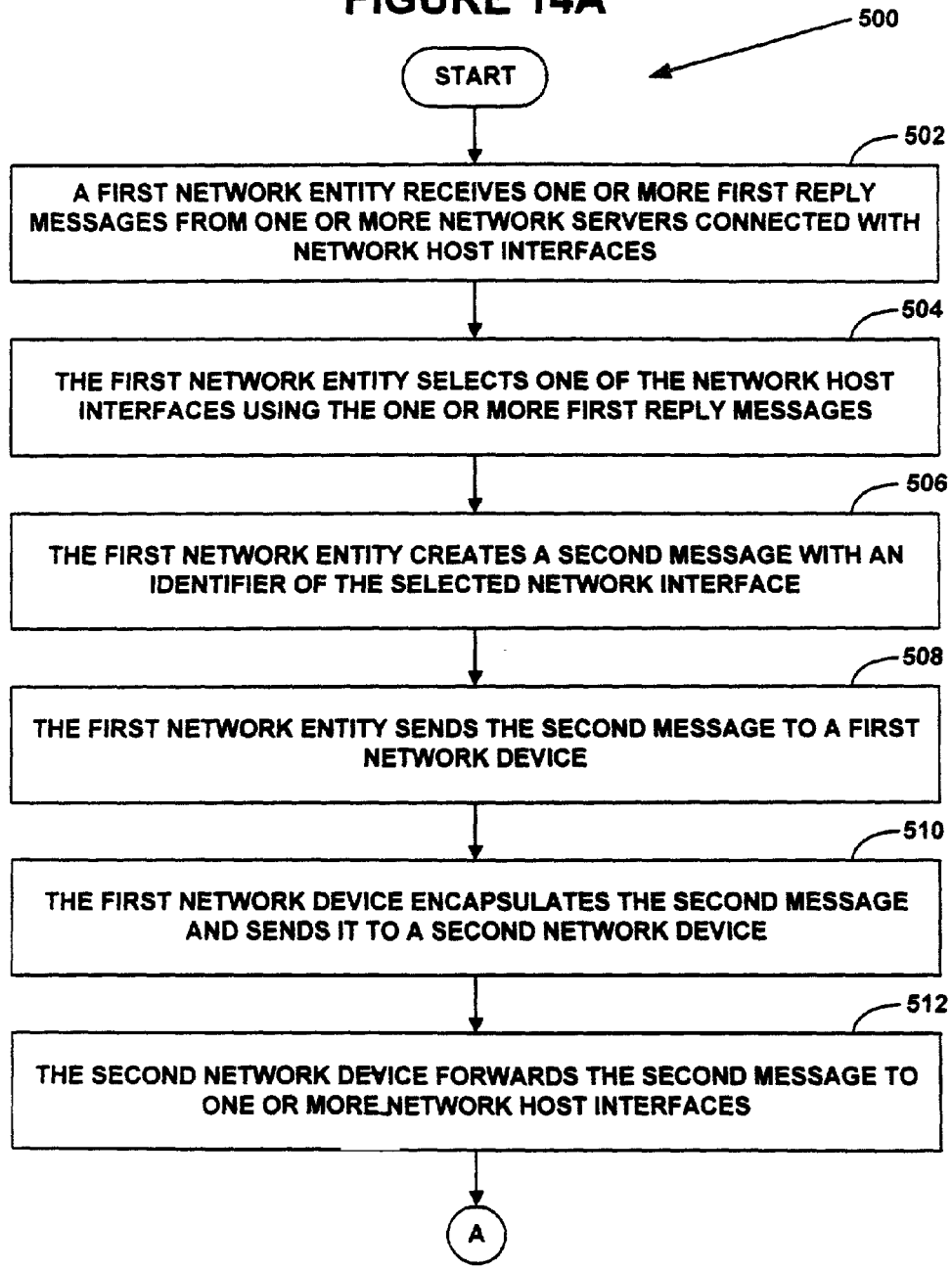

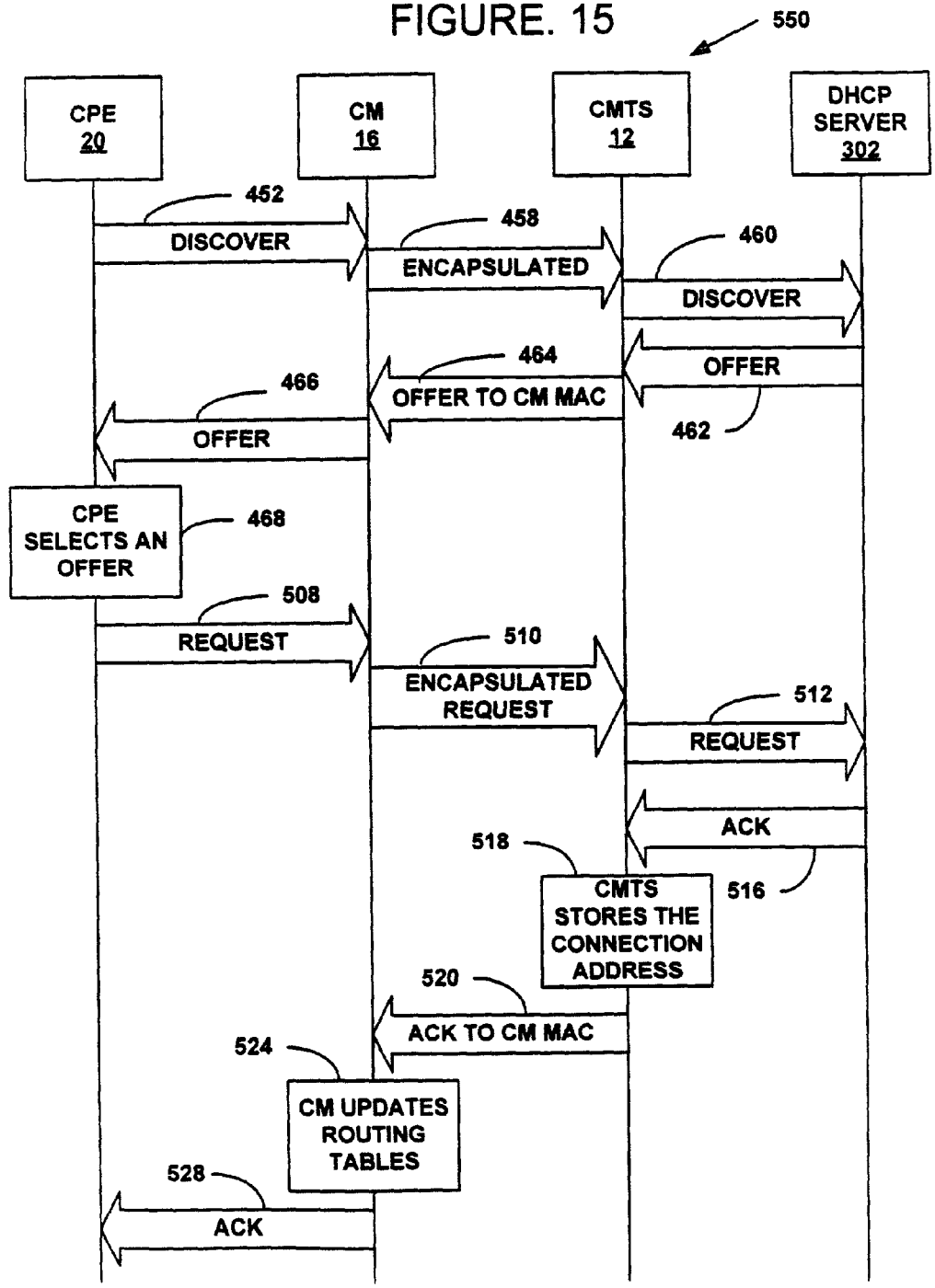

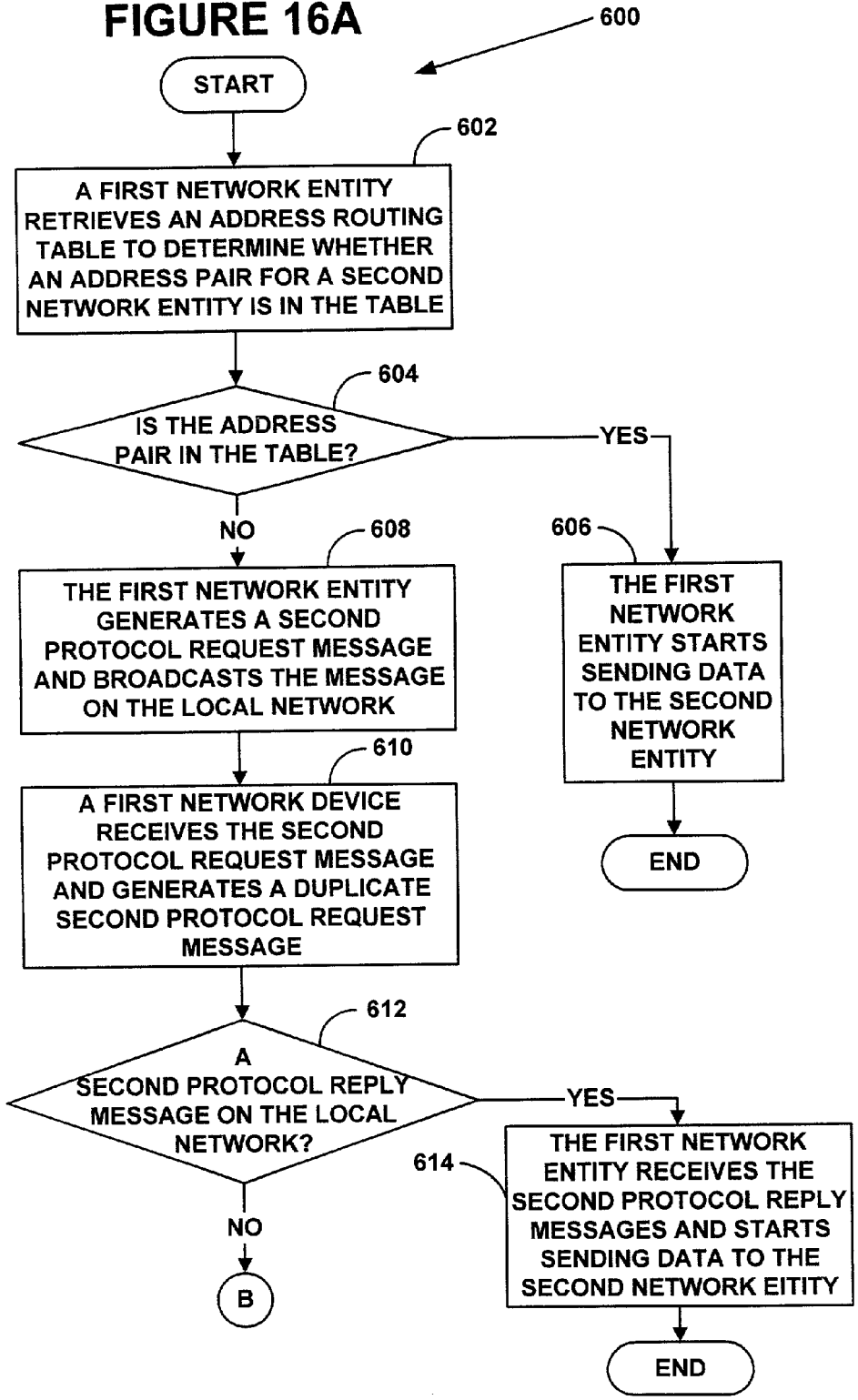

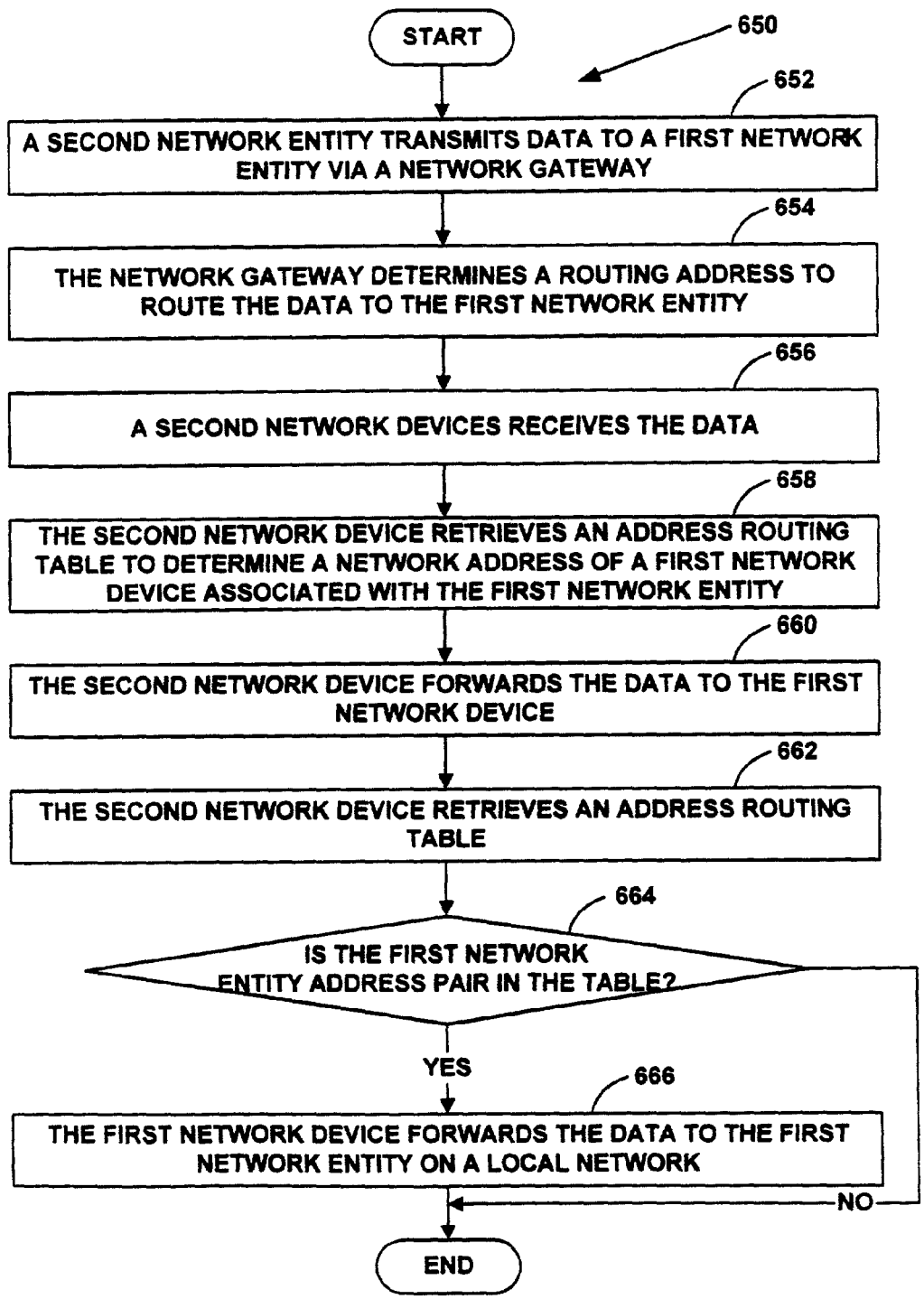

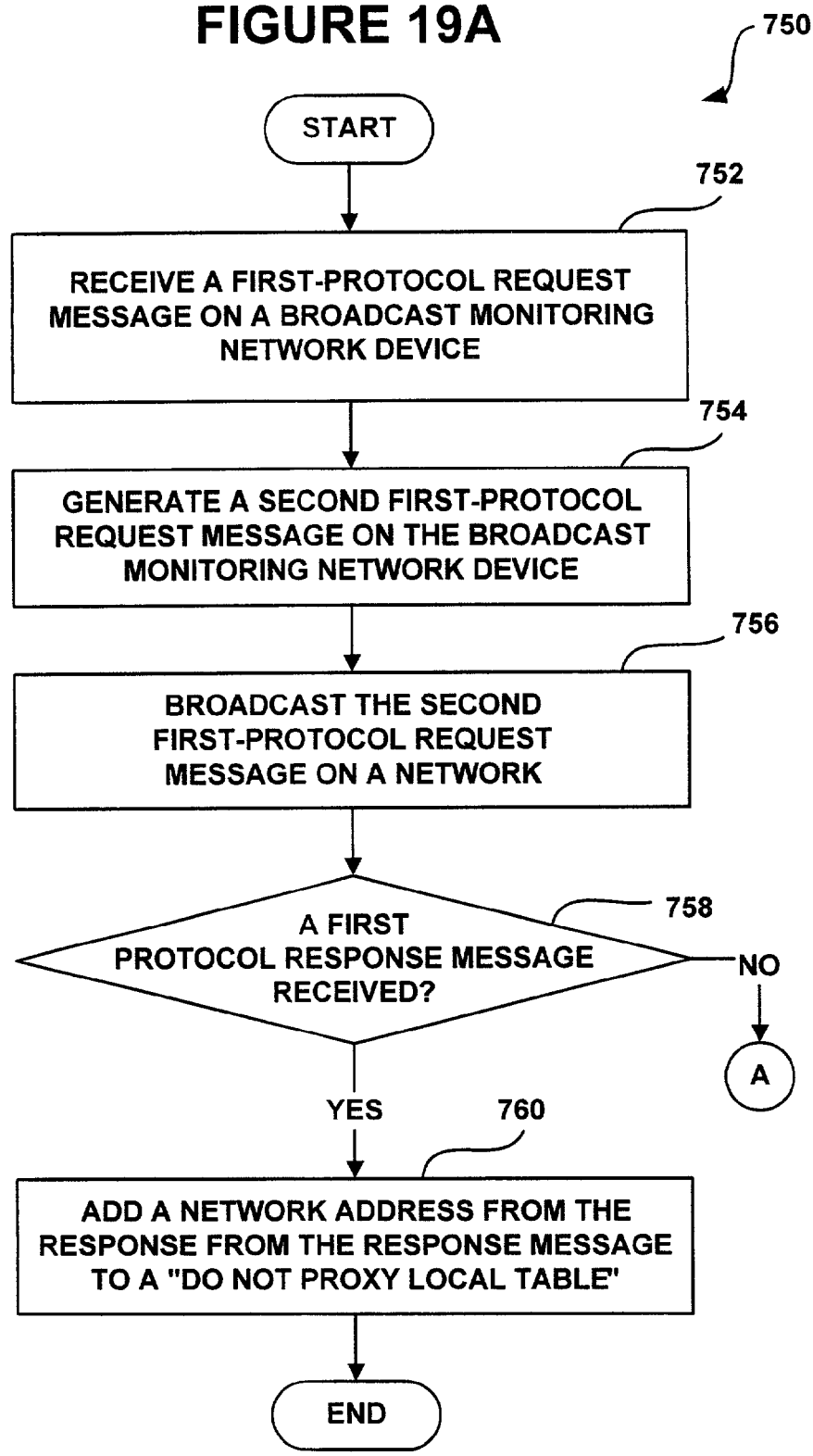

FIGURE 21

| HARWARE TYPE 822 | PROTOCOL TYPE 824 |
| --- | --- |
| HLEN 826 / PLEN 828 | OPERATION 830 |
| SOURCE MAC 832 | |
| SOURCE IP 834 | |
| DESTINATION MAC 836 | |
| DESTINATION IP 838 | |

PACKET SENT TO THE CPE 810 → 900

| SRC IP 902<br>149.112.85.162 | DEST IP 904<br>208.213.136.161 | SRC MAC 906<br>00-20-AF-67-C4-62<br>(INTERNET GATEWAY) | DEST MAC 908<br>00-50-01-20-77-AA<br>(CMTS ETHERNET) |

CMTS SENDS TO RF SIDE → 930

| SRC IP 910<br>149.112.85.162 | DEST IP 912<br>208.213.136.161 | SRC MAC 914<br>CMTS MAC<br>INTERFACE ADDRESS | DEST MAC 916<br>00-00-86-01-AF-47<br>(CPE) |

ECM FORWARDS THE PACKET → 940

| SRC IP 918<br>149.112.85.162 | DEST IP 920<br>208.213.136.161 | SRC MAC 922<br>CMTS MAC<br>INTERFACE ADDRESS | DEST MAC 924<br>00-00-86-01-AF-47<br>(CPE) |

SYSTEM AND METHOD FOR RESOLVING NETWORK ADDRESSES FOR NETWORK DEVICES ON DISTRIBUTED NETWORK SUBNETS

FIELD OF THE INVENTION

The present invention relates to communications in computer networks. More particularly, it relates to methods and a system for resolving network addresses on physically and virtually distributed subnets.

BACKGROUND OF THE INVENTION

Cable television networks such as those provided by Comcast Cable Communications, Inc., of Philadelphia, Pa., Cox Communications of Atlanta Ga., Time-Warner Cable, of Marietta Ga., Continental Cablevision, Inc., of Boston Mass., and others, provide cable television services to a large number of subscribers over a large geographical area. The cable television networks typically are interconnected by cables such as coaxial cables or a Hybrid Fiber/Coaxial ("HFC") cable system which have data rates of about 10 Mega-bits-per-second ("Mbps") to 30+ Mbps.

The Internet, a world-wide-network of interconnected computers, provides multi-media content including audio, video, graphics and text that requires a large bandwidth for downloading and viewing. Most Internet Service Providers ("ISPs") allow customers to connect to the Internet via a serial telephone line from a Public Switched Telephone Network ("PSTN") at data rates including 14,400 bps, 28,800 bps, 33,600 bps, 56,000 bps and others that are much slower than the about 10 Mbps to 30+Mbps available on a coaxial cable or HFC cable system on a cable television network.

With the explosive growth of the Internet, many customers have desired to use the larger bandwidth of a cable television network to connect to the Internet and other computer networks. Cable modems, such as those provided by 3Com Corporation of Santa Clara, Calif., Motorola Corporation of Arlington Heights, Ill., Cisco Corporation of San Jose, Calif., Scientific-Atlanta, of Norcross, Ga. and others offer customers higher-speed connectivity to the Internet, an intranet, Local Area Networks ("LANs") and other computer networks via cable television networks. These cable modems currently support a data connection to the Internet and other computer networks via a cable television network with a data rate of up to 30+Mbps, which is a much larger data rate than can be supported by a modem used over a serial telephone line.

Many cable television networks provide bi-directional cable systems, in which data is sent "downstream", from a "headend" to a customer, as well as "upstream", from the customer back to the headend. The cable system headend is a central location in the cable television network and, further, is responsible for sending cable signals in the downstream direction and receiving cable signals in the upstream direction. An exemplary data-over-cable system with RF return typically includes customer premises equipment such a customer computer, a cable modem, a cable modem termination system, a cable television network, and a data network such as the Internet.

Some cable television networks provide only uni-directional cable systems, supporting only a "downstream" data path, which provides a path for flow of data from a cable system headend to a customer. A return data path via a telephone network, such as a public switched telephone network provided by AT&T and others, (i.e., a "telephone return") is typically used for an "upstream" data path, which provides a path for a flow of data from the customer back to the cable system headend. A cable television system with an upstream connection to a telephone network is typically called a "data-over-cable system with telephone return."

An exemplary data-over-cable system with a telephone return typically includes customer premises equipment ("CPE") entities (such as a customer computer or a Voice over Internet Protocol ("VoIP") device), a cable modem, a cable modem termination system, a cable television network, a public switched telephone network, a telephone remote access concentrator, and a data network (e.g., the Internet). The cable modem termination system and the telephone remote access concentrator combined are called a telephone return termination system.

If the customer premises equipment entity comprises a telephone or a device capable of sending and receiving video or voice signals, the cable modem has to be capable of sending and receiving such signals. In such cases the cable modem typically comprises an internal media terminal adapter, which provides a network interface functionality that accepts analog voice inputs or video signal and generates IP packets using the Real Time Transport protocol, for instance.

In a bi-directional cable system, when the cable modem termination system receives data packets from the data network, the cable modem termination system transmits received data packets downstream via the cable television network to a cable modem attached to the customer premises equipment entity. The customer premises equipment entity sends response data packets to the cable modem, which sends the response data packets upstream via the cable network. The cable modem termination system sends the response data packets back to the appropriate host on the data network.

In the case of a telephone return system, when a cable modem termination system receives data packets from the data network, the cable modem termination system transmits the received data packets downstream via the cable television network to a cable modem attached to a customer premises equipment entity. The customer premises equipment entity sends response data packets to the cable modem, which sends response data packets upstream via the public switched telephone network to a telephone remote access concentrator. Next, the telephone remote access concentrator sends the response data packets back to the appropriate host on the data network.

When a cable modem used in the cable system with the telephone return is initialized, a connection is made to both the cable modem termination system via the cable network and to the telephone return termination system via the public switched telephone network. As the cable modem is initialized, the cable modem initializes one or more downstream channels via the cable network. Also upon initialization, the cable modem receives a configuration file from a configuration server via a trivial file-transfer protocol ("TFTP") exchange.

Every host or a router on the Internet has an Internet Protocol ("IP") address, which encodes its network address and a host number to form a unique network address combination. All hosts on the same network must have the same network number, and this property of Internet Protocol addressing has been causing some problems as the size of networks is constantly growing. As the number of distinct local area networks ("LANs") grows, managing those networks can be problematic since each local area network would need a separate network number that, consequently, has to be announced worldwide. Furthermore, moving a network device from one local area network to another requires the network device to change its Internet Protocol address, which in turn may mean modifying its configuration files and announcing a new Internet Protocol address to the world. If some other network device is given the newly released Internet Protocol address, that network device will get data intended for the original network device until the Internet Protocol address has propagated all over the world.

One of the currently existing solutions allows a network to be split into several parts for an internal use but still act like a single network to the outside world. Each of such network parts is commonly referred to as a subnet that may further split over several subnets. Such a network appears to subscriber network devices as a single network; however, more than one local area network elements may exist over network connections such as Wide Area Network ("WAN") connections, or optical network connections. Such networks typically include a plurality of subscriber nodes such as cable modems supporting home local area networks. A home local area network may include addresses assigned within a predetermined subnet administered, for example, by an Internet Service Provider, a cable operator such as a Multiple System Operator ("MSO"), or a Local Exchange Carrier ("LEC"), or agents thereof. In such a network, data flows may require network devices within the network to resolve network addresses of the devices that they want to communicate with. Often, the existing address resolution protocols cannot properly handle the address resolution for network devices on physically distributed subnets because of physical assumptions that are made by those protocols.

Typically, the address resolution is handled by an address resolution protocol ("ARP"). There are many versions of the address resolution protocol. One of the ARP versions includes a proxy address resolution protocol that allows other devices (a different device than the one queried) to respond to a query in place of network unreachable devices. The proxy address resolution protocol, similarly to other versions of the protocol, such as a directed address resolution protocol, or an inverse address resolution protocol, is widely used in such networks. However, these protocols have physical assumptions built into them. The physical assumptions include, for example, an assumption that the queried network device is unreachable by the normal address resolution protocol. However, as mentioned in the proceeding paragraphs, networks can have subnet splits over various disjoint nodes, and, for a proper operation of a network, it should not be assumed that a queried network device is, or is not, available. Further, in such networks, it should not be assumed that the correct response is that of a network device proxying the queried network device.

Thus, it is desirable to develop a method and system for resolving network addresses in physically and virtually distributed subnets, such as distributed Internet Protocol subnets.

SUMMARY OF THE INVENTION

According to exemplary embodiments, methods and system for resolving network addresses in physically and virtually distributed subnets are developed.

One exemplary method includes, responsive to receiving a first address resolution protocol request message on a cable modem from a first CPE to a second CPE, the cable modem generates a second address resolution protocol request message to the second CPE and sends it on a local network. If the cable modem does not receive an address resolution protocol response message from the second CPE, the cable modem determines a network subnet associated with the first CPE. Subsequently, the cable modem determines a MAC address of a network element arranged to provide traffic gating to CPEs associated with the subnet of the first CPE. Next, the cable modem generates an address resolution protocol response message including the MAC address of the network element and sends the address resolution protocol response message to the first CPE.

These as well as other aspects and advantages of the present invention will become more apparent to those ordinary skilled in the art by reading the following detailed description, with reference to the accompanying drawings.

BRIEF DESCRIPTION OF THE DRAWINGS

Preferred embodiments of the present invention are described with reference to the following drawings, wherein:

FIGS. 14A and 14B are a flow chart illustrating a method for resolving addresses for a customer premises equipment entity;

FIG. 15 is a block diagram illustrating a message flow for resolving addresses for a customer premises equipment entity;

FIGS. 16A and 16B are a flow chart illustrating a method for sending data from a customer premises equipment entity;

FIG. 17 is a flow chart illustrating a method for receiving data on a customer premises equipment entity;

FIGS. 19A and 19B is a flow chart illustrating a method for resolving network addresses in a system having a plurality of distributed subnets;

FIG. 21 is a block diagram illustrating an exemplary address resolution protocol format;

FIG. 23 illustrate block diagrams showing an exemplary set of address resolution protocol messages that may be sent downstream to a host entity.

DETAILED DESCRIPTION OF AN EXEMPLARY EMBODIMENT

Exemplary Data-Over-Cable System

Most cable providers predominantly provide bi-directional cable systems, supporting both a "downstream" and an "upstream" data paths. A downstream data path is a flow of data from a cable television network "headend" to customer premises equipment such as a customer's personal computer or a VoIP device, for example. An upstream data path is a data path from a customer premises equipment entity back to a headend. In bi-directional data-over-cable systems, a cable television network headend is a central location that is responsible for sending cable signals in a downstream direction and receiving cable signals in an upstream direction.

Alternatively, a data-over-cable system may be a uni-directional cable system supporting only a downstream data path from a cable television network headend to customer premises equipment entities. In the uni-directional cable system, a return path is typically established via a telephone network ("telephone return"), which provides an upstream data path from the customer premises equipment back to the cable television network headend. In a uni-directional cable system, a cable modem may comprise an integral telephone modem for connecting to a Public Switched Telephone Network ("PSTN"), and the integral telephone modem may be connected to the cable modem for exchanging data. However, there are many limitations associated with the data transfer via a telephone return such as low bandwidth availability on the upstream channels and a need for synchronization with a downstream path and available RF spectrum.

Figure 1:
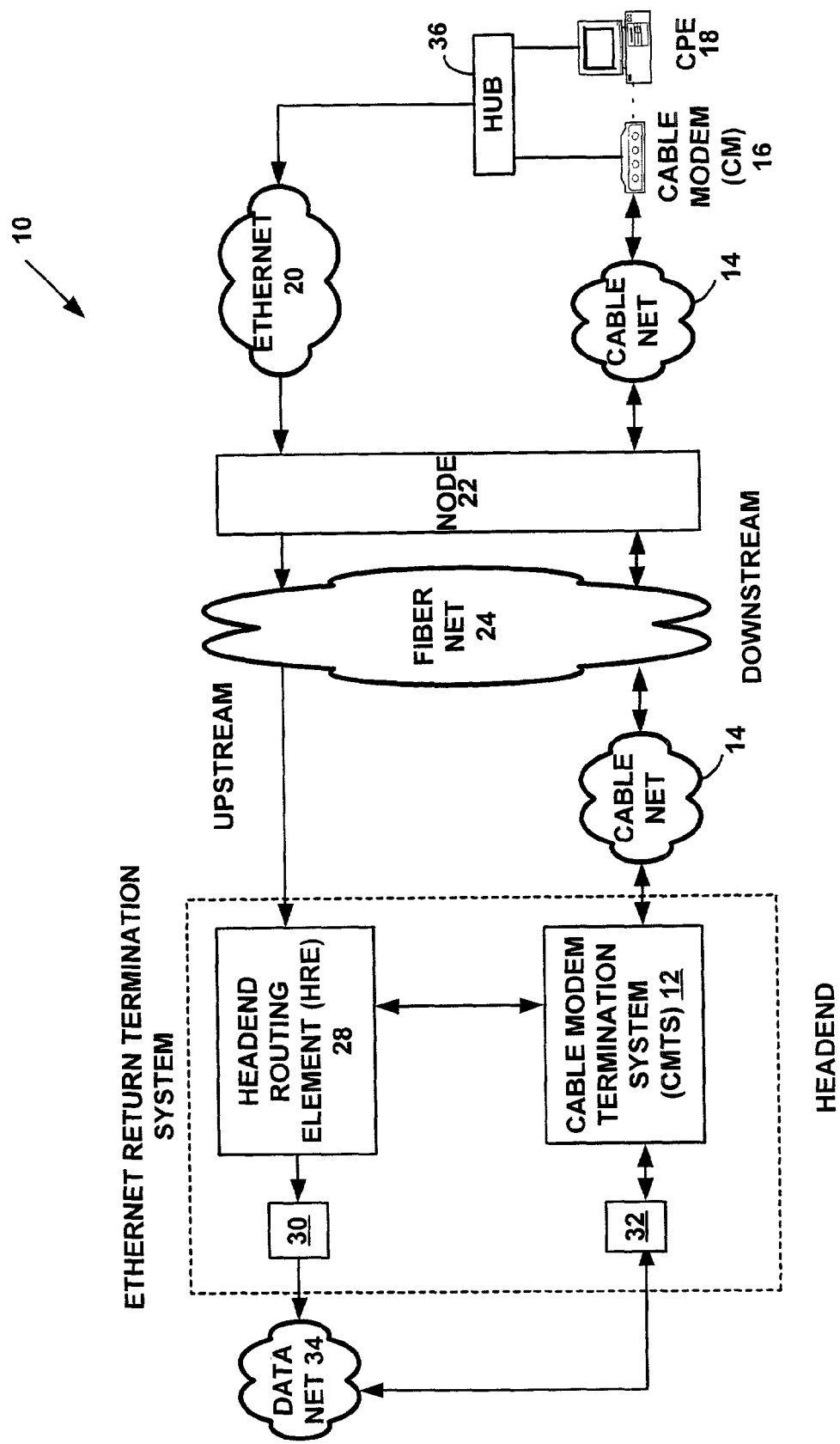
FIG. 1 is a block diagram illustrating a cable modem system with an Ethernet-return path in which exemplary embodiments of the present invention may be applied.

FIG. 1 is a block diagram illustrating a data-over-cable system with Ethernet return 10, hereinafter the Ethernet-return cable system 10. The Ethernet-return cable system 10 includes a Cable Modem Termination System ("CMTS") 12 connected to a cable television network 14, hereinafter a cable network 14. FIG. 1 illustrates only one CMTS 12. However, the Ethernet-return cable system 10 may include multiple CMTS 12. Further, according to an exemplary embodiment, the CMTS 12 and any other network entities that will be described in the following paragraphs may be duplicated in a serial or a parallel arrangement to provide a back-up in case of failure.

In the exemplary embodiment of the present invention, the CMTS 12 may be a Total Control hub by 3Com Corporation of Santa Clara, Calif., with a cable modem termination unit. A Total Control hub is a chassis with multiple networking cards connected by a common bus. However, the CMTS 12 could also be another network server such as a network server by Cisco Systems of San Jose, Calif., for example. The cable network 14 may be a cable television network such as one provided by Comcast Cable Communications, Inc., of Philadelphia, Pa., Cox Communications of Atlanta, Ga., or Time-Warner Cable, of Marietta, Ga., for example.

A cable modem ("CM") 16 is connected to a downstream radio frequency cable connection of the cable network 14 via a local node 22 terminating a fiber network 24. The fiber network 24 could be any existing or later developed fiber network such as a Fiber To The Home ("FTTH") network. Further, according to an exemplary embodiment, the local node 22 may include an optical node unit ("ONU") such as an optical fiber node and/or a CableTV ("CATV") node, for example.

According to an exemplary embodiment, the CM 16 is connected to the local fiber node via an Ethernet port. However, the exemplary embodiment is not limited to these types of nodes, and may also include a wireless connection on a downstream path. As known in the art, an ONU is a type of an access node that converts optical signals to electrical signals and vice versa. Thus, an ONU is an interface between fiber optics feeder cables and metallic cables. In one exemplary embodiment, the cable node 22 is tapped in such a manner that it serves a single cable modem user. However, other embodiments are possible as well. For example, the cable node 22 may be tapped to a plurality of users. According to an exemplary embodiment, the CM 16 may be provided by 3Com Corporation of Santa Clara, Calif., or Motorola Corporation of Arlington Heights, Ill., for example. The CM 16 is connected to Customer Premises Equipment ("CPE") 18 such as a personal computer or a VoIP entity, for example. As shown in FIG. 1, the CM 16 is connected to the CPE 18 via a cable modem-to-CPE interface ("CMCI").

According to an exemplary embodiment, the CM 16 and the CPE 18 are connected to an Ethernet network 20 via a network hub 36. According to an exemplary embodiment, the Ethernet network 20 is used as an upstream connection from the CM 16. An Ethernet network is one of the types of a Local Area Network ("LAN") and uses coaxial cable or grades of twisted pair wires. In one embodiment, the Ethernet network 20 could be a 10 BASE-T Ethernet network providing transmission speeds up to 10 Mbps, a Fast Ethernet network providing transmission speeds up to 100 Mbps or a Gigabit Ethernet network providing transmission speeds up to 1 Gbps, for example. For example, if the Ethernet network is used as an upstream connection, the CM 16 is equipped with an interface card connected to an Ethernet hub. The embodiment shown in FIG. 1 is not limited to an upstream connection over an Ethernet network, and other types of networks such as a HomePNA ("HPNA") networks could also be used. As known in the art, the HPNA is an industry standard for interconnecting computers within a house, and it uses an existing wiring system, an Ethernet framing and an Ethernet transmission protocol.

The Ethernet network 20 is connected via the optical network 24 to a Headend Routing Element ("HRE") 28. According to an exemplary embodiment, the HRE 28 terminates Ethernet sessions from the CM 16 and in combination with the CMTS 12 forms an "Ethernet Return Termination System" illustrated as a dashed box in FIG. 1. According to an exemplary embodiment, the HRE 28 and the CMTS 12 may be collocated at a headend of the cable system 10. Alternatively, the HRE 28 may include a routing element located elsewhere and may have routing association with the CMTS 12. The HRE 28 and the CMTS 12 form the Ethernet Return Termination System whether or not the HRE 28 is located at the headend of the cable network 14, and the HRE 28 may be located in a different geographic location from the CMTS 12.

Further, the Ethernet-return cable system 10 may also include a plurality of servers such as operations servers, administrative servers or maintenance servers (not shown). The CMTS 12 shown in FIG. 1 may also connect a plurality of access points to the data-over-cable system 10. Additionally, the plurality of access points may be connected to cable headend access points. Such configurations may be "one-to-one", "one-to-many", or "many-to-many", and may be interconnected to other Local Area Networks ("LANs"), Metropolitan Area Networks ("MANs") or Wide Area Networks ("WANs").

The data-over-cable system 10 may comprise a plurality of network interfaces. As shown in FIG. 1, the HRE 28 is connected to a data network 34 (e.g. the Internet, an intranet, a LAN, a MAN or a WAN, for instance) via an HRE-Network System Interface 30 ("HRE-NSI"). The CMTS 12 is connected to the data network 28 via a CMTS-Network System Interface ("CMTS-NSI") 32.

In one exemplary embodiment, when an IP packet destined for the CPE 18 enters the CMTS 12 via the CMTS-NSI 32, the CMTS 12 may encode the IP packet per the DOCSIS specification, for example, and may transmit the IP packet via the cable network 14 and the fiber node 22 to the CM 16. Once the CM 16 receives the IP packet and recognizes that the IP packet is destined to an address of the attached CPE 18, the CM 16 decodes the IP packet and passes it to the CPE via the CMCI. If the CPE 18 responses to the IP packet, the response from the CPE 18 is first sent to the CM 16 via the CMCI. In one embodiment, if the Ethernet network is used as an upstream connection, the CM 16 encapsulates a response IP packet from the CPE 18 into a unicast Ethernet frame and sends it to the HRE 28. The HRE 28 may decode the IP response packet from the CPE and may forward it to a destination via the HRE-NSI 30.

Network devices for exemplary embodiments of the present invention include network devices that can interact based on standards proposed by the Data-Over-Cable-Service-Interface-Specification ("DOCSIS") standards from the Multimedia Cable Network Systems ("MCNS"), the Institute of Electrical and Electronic Engineers ("IEEE"), International Telecommunications Union-Telecommunication Standardization Sector ("ITU"), Internet Engineering Task Force ("IETF"), and/or Wireless Application Protocol ("WAP") Forum. However, network devices based on other standards could also be used. DOCSIS standards can be found on the World Wide Web at the Universal Resource Locator ("URL") "www.cablemodem.com." IEEE standards can be found at the URL "www.ieee.org." The ITU, (formerly known as the CCITT) standards can be found at the URL "www.itu.ch." IETF standards can be found at the URL "www.ietf.org." The WAP standards can be found at the URL "www.wapforum.org." However, the present invention is not limited to these standards, and any other presently existing or developed in a future standards could also be used.

Further, the present invention is not limited to the use within the system illustrated in FIG. 1. More, fewer or different components, connections and interfaces could also be used. Further, the arrangements described herein are shown for purposes of illustration only, and those skilled in the art will appreciate that other arrangements and other elements, such as interfaces or functions, whether or not known in the art, can be used instead, and some elements may be omitted altogether. Additionally, as in most communications applications, those skilled in the art will appreciate that many of the elements described herein are functional entities that may be implemented as discrete components or in conjunction with other components, in any suitable combination and location.

Further, as mentioned above, network entities in the Ethernet-return system 10 may be duplicated to provide a back-up in case of failure of one or more network entities. For instance, the network entities may be duplicated in parallel or in series. For example, the HRE 28 and a duplicated an HRE 28' (not shown) may operate simultaneously, with one of them active and the other one in a "standby" state. In such an arrangement, the two units may communicate using a "keep alive" signal, for instance. Thus, if the primary HRE 28 fails, the redundant HRE 28' may immediately start operating, and, ideally, there is no loss of service.

In another exemplary embodiment providing a back-up system, redundant units may operate in a serial manner. In the serial arrangement, units may be cross-connected with a heart-beat controlled shunt on ports. Further, in the serial arrangement, both units may be active, as opposed to a primary device being in an active state and a redundant device being in a standby state, as in the parallel arrangement. In another exemplary embodiment of the present invention, any individual integral components or groups of components may be duplicated.

An operating environment for each CMTS 12, CM 16, CPE 18, HRE 28 and other network entities of an exemplary embodiment may include a processing system with at least one high speed processing unit and a memory system. In accordance with the practices of persons skilled in the art of computer programming, the present invention is described below with reference to acts and symbolic representations of operations or instructions that are performed by the processing system, unless indicated otherwise. Such acts and operations or instructions could be referred to as being "computer-executed", "processing unit executed", or the like.

It will be appreciated that the acts and symbolically represented operations or instructions include the manipulation of electrical signals by the processing unit. An electrical system with data bits causes a resulting transformation or reduction of the electrical signal representation, and the maintenance of data bits at memory locations in the memory system to thereby reconfigure or otherwise alter the processing unit's operation, as well as other processing of signals. The memory locations may be physical locations that could have particular electrical, magnetic, optical, or organic properties for maintaining data bits.

The data bits may also be maintained on a computer readable medium such as magnetic disks, optical disks, organic disks, and any other volatile or non-volatile mass storage system readable by the processing unit, for instance. The computer readable medium may include cooperating or interconnected computer readable media, which may exist exclusively on the processing system or may be distributed among multiple interconnected processing systems that may be local or remote to the processing system.

Ethernet Return Network Device Protocol Stack

Figure 2:
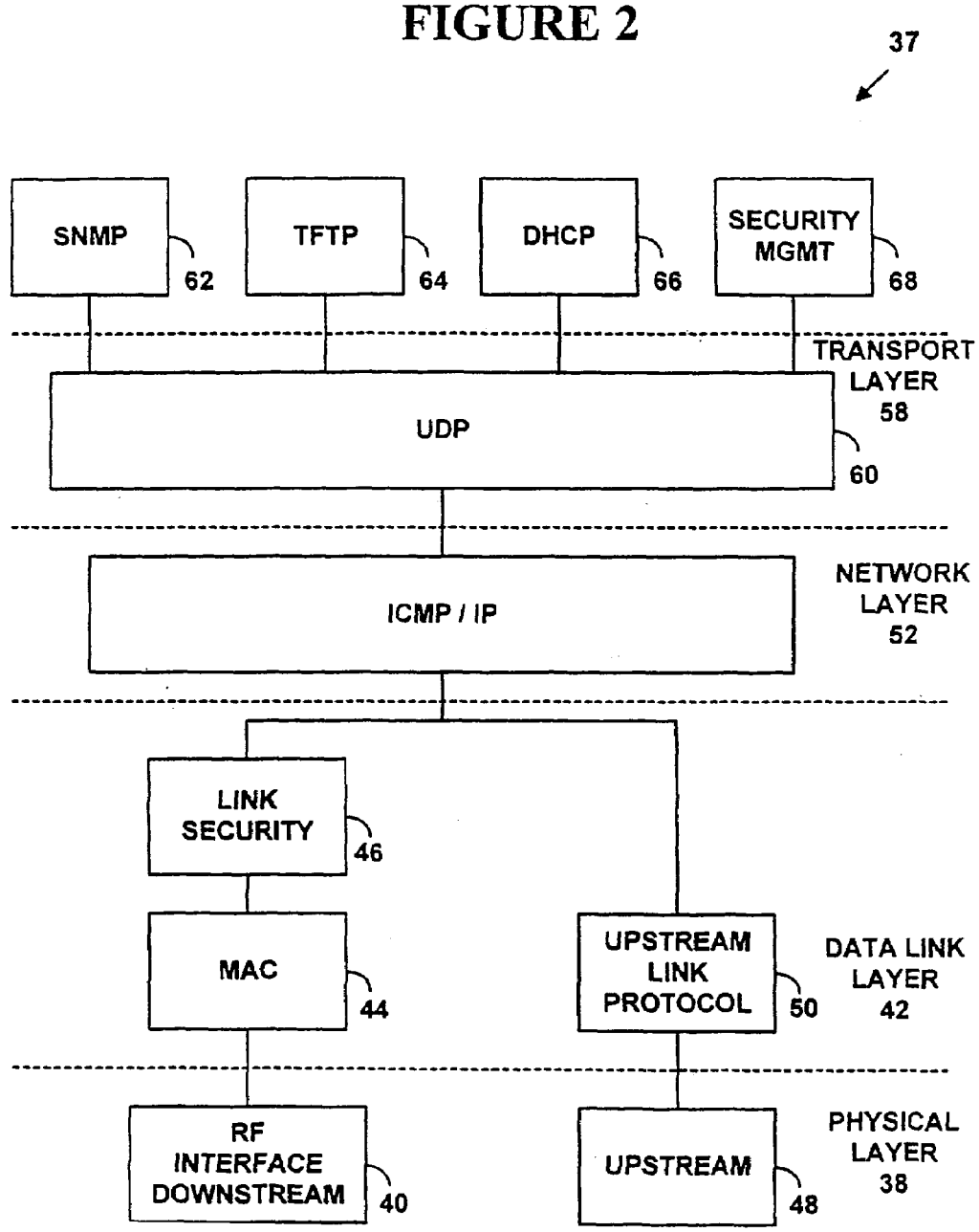
FIG. 2 is a block diagram illustrating a protocol stack for a data-over-cable system with an Ethernet-return data path.

FIG. 2 is a block diagram illustrating an exemplary protocol stack 37 for network devices in the Ethernet-return cable system 10. In an exemplary embodiment of the present invention, network entities in the Ethernet-return cable system 10 are DOCSIS compliant. However, other standards may also be used, and the present invention is not limited to DOCSIS compliant network entities.

FIG. 2 illustrates downstream and upstream protocols used in the CM 16, for instance. As known in the art, the Open System Interconnection ("OSI") model may be used to describe computer networks. The OSI model consists of seven layers including, from lowest to highest, a physical layer, a data-link layer, a network layer, a transport layer, a session layer, a presentation layer and an application layer. The physical layer transmits bits over a communication link. The data-link layer transmits error free frames of data. The network layer transmits and routes data packets.

In the Ethernet-return cable system 10 according to an exemplary embodiment, the CM 16 is connected to the cable network 14 in a physical layer 38 via a Radio Frequency ("RF") Interface 40. According to an exemplary embodiment, the RF Interface 40 is only used for a downstream communication and may have an operation frequency range of 50 Mega-Hertz ("MHz") to 1 Giga-Hertz ("GHz") and a channel bandwidth of about 6 to 8 MHz. However, other operation frequencies may also be used, and the invention is not limited to these frequencies. Further, the RF Interface 40 may use a signal modulation method, such as Quadrature Amplitude Modulation ("QAM"). As known in the art, the QAM is used as means for encoding digital information over radio, wire, or fiber optic transmission links. The QAM is a combination of amplitude and phase modulation and is an extension of a multiphase phase-shift-keying. The QAM may have any number of discrete digital levels typically including 4, 16, 64 or 256 levels. In an exemplary embodiment, QAM-64 may be used in the RF Interface 40. However, other operating frequencies and modulation methods could also be used, such as a Quadrature Phase Shift Keying ("QPSK") modulation, for instance.

In a data-over-cable system with an Ethernet return employed for an upstream connection, the CM 16 may be connected to the Ethernet in the physical layer via an interface 48 such as an Ethernet interface. If the upstream connection is a wireless connection the interface 48 is a wireless interface. However, other types of upstream connections and interfaces could also be used.

Above the RF Interface 40, there is a data link layer comprising a Medium Access Control ("MAC") layer 44. As known in the art, the MAC layer 44 controls access to a transmission medium via the physical layer 38. The MAC layer 44 may use a protocol described in IEEE 802.14. However, other MAC layer protocols could also be used, such as the MCNS MAC layer protocol, for instance. Above the MAC layer 44 may be a link security protocol stack 46. The link security protocol stack 46 prevents unauthorized users from making a data connection from the cable network 14. According to an exemplary embodiment, the CM 16 discards the MAC management messages that relate to the upstream traffic acquisition and upstream data traffic over the RF channel.

An upstream connection protocol layer 50 is in the data link layer 42 and above the interface 48. According to an exemplary embodiment, the upstream connection protocol layer is an Ethernet protocol layer. The Ethernet layer 50 could be one of the existing or later developed Ethernet protocol layers such as an IEEE 802.3 protocol, or any IEEE 802.3x protocols, where "x" corresponds to standards associated with different versions of Ethernet networks. For example, the IEEE 802.3i standard is associated with the 10 Mbps Ethernet networks. According to an exemplary embodiment, the CM 16 receives information regarding a unicast Ethernet destination address and supports encapsulation of CPE initiated upstream Ethernet transmission.

A network layer 52 is above both the downstream protocol layer and the upstream protocol layer. The network layer 52 comprises an Internet Protocol ("IP") layer and an Internet Control Message Protocol ("ICMP") layer. The IP layer corresponds to the OSI layer 3, which is the network layer, but, typically, it is not defined as part of the OSI model. As known in the art, the IP is a routing protocol designed to route traffic within a network or between networks. More information on the IP protocol may be found at the URL "www.ietf.org" in RFC-791. The ICMP layer is used for network management. The ICMP provides a plurality of functions, such as error reporting, reachability testing (e.g., "pinging"), congestion control, route-change notification and performance or subnet addressing, for instance. More information on the ICMP may be found at the URL "www.ietf.org" in RFC-792.

A transport layer 58 is above the network layer 52. The transport layer 60 comprises a User Datagram Protocol ("UDP") layer 60, which approximately corresponds to the OSI layer 4., the transport layer. As known in the art, the UDP provides a connectionless mode of communications with datagrams. More information on the UDP layer 60 may be found at the URL "www.ietf.org" in RFC-768. However, the transmission layer 58 is not limited to the User Datagram Protocol and other protocols could also be used, such as a Transmission Control Protocol ("TCP"), for instance. More information on the TCP may be found at the URL "www.ietf.org" in RFC-793.

Above the transport layer 58, there are a Simple Network Management Protocol ("SNMP") layer 62, a Trivial File Transfer Protocol ("TFTP") layer 64, a Dynamic Host Configuration Protocol ("DHCP") layer 66 and a Security Management layer 68. The SNMP layer 62 is used to support network management functions. More information on the SNMP layer may be found at the URL "www.ietf.org" in RFC-1157. The TFTP layer 64 is a file transfer protocol, which is typically used to download files and configuration information. More information on the TFTP layer 64 may be found at the URL "www.ietf.org" in RFC-1350. The DHCP layer 66 is a protocol for passing configuration information to host on the IP network 54. More information on the DHCP layer 66 may be found at the URL "www.ietf.org" in RFC-1541, RFC-2131 and RFC-2132. The Security management layer 68 distinguishes and routes packets to an appropriate service. More information on the security management layer 68 may be found at the URL "www.cablemodem.com" in the "DOCSIS Baseline Data-Over-Cable Security Specification SP-BPI." However, more, fewer, or different protocol layers could also be used in the Ethernet-return data-over-cable system 10.

In one embodiment, the CM 16 may support transmission and reception of IP datagrams as specified by RFC-791. Some routers have security features intended to filter out invalid users who alter packets as if sent from a valid user. Since routing policies are typically under the control of network operators, such filtering is a vendor specific implementation. For example, dedicated interfaces (i.e., Frame Relay) may exist between the HRE 28 and CMTS 12 that preclude filtering, or various forms of tunneling and reverse tunneling could be used to virtually source upstream packets from the CMTS 12.

Further, in one embodiment, the CM 16 is able to forward IP datagrams destined to an IP multicast network address across a cable network, for example. Further, the CM 16 is configurable to keep IP multicast forwarding tables and to use group membership protocols. The CM 16 that wants to send a multicast packet across a tunnel may prepend another IP header, set a destination address to a new header to be the unicast IP address of the CMTS 12 at the other end of the tunnel, and set the IP protocol field in the new header to a number four, where the number four signifies that the next protocol is the IP protocol. When the CMTS 12 at the other end receives the packet, the CMTS 12 strips off the encapsulating IP header and forwards the packet. According to an exemplary embodiment, the CMTS 12 does not use the upstream multicast tunnel as a virtual interface downstream through the cable network 14.

Initialization of a Cable Modem with Ethernet Return

Figure 3:
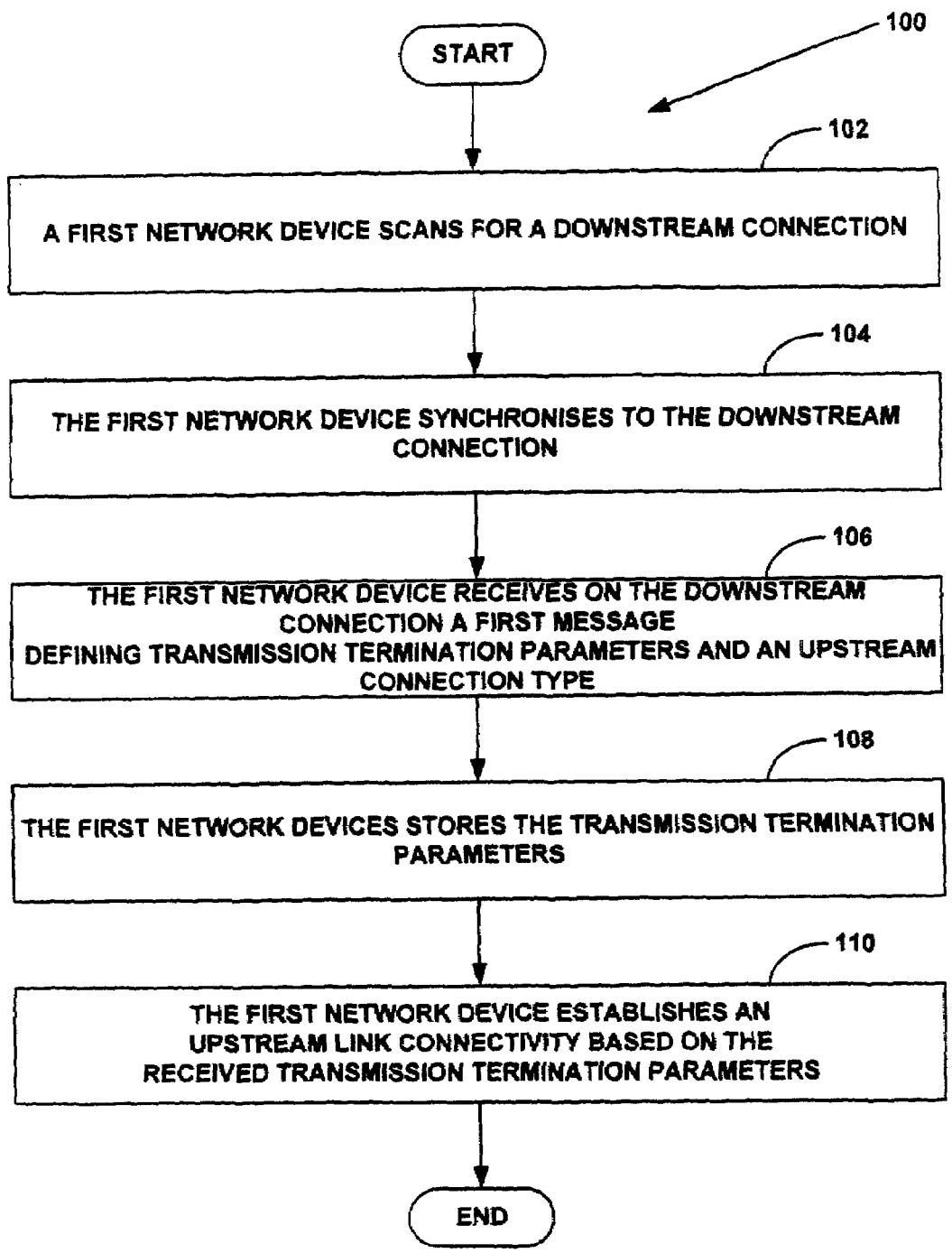
FIG. 3 is a flow chart illustrating an exemplary method for receiving upstream termination information parameters on a network device.

FIG. 3 is a flow chart illustrating a method 100 for initializing a network device in a data-over-cable network having a special type of the return path. At step 102, a first network device scans for a downstream channel on a first downstream connection type. Once the first network device locks to a valid first downstream connection type, at step 104, the first network device synchronizes to the first downstream connection. In one embodiment, in order to synchronize to a downstream connection, the first network device synchronizes to the QAM symbol timing, Forward Error Correction ("FEC") framing and Moving Pictures Experts Group ("MPEG") framing.

At step 106, the first network device receives a first message from a second network device on the first downstream connection. In one embodiment, the first message includes transmission termination parameters for an upstream connection type and a plurality of service provider descriptor ("SPD") parameters. The transmission termination parameters include mode of operation parameters, termination router parameters and customer access parameters such as a user login and a user password. In one embodiment, the termination router parameters include a plurality of MAC addresses of routing network devices associated with the upstream connection type. For example, each MAC address may be associated with a headend network device of a predetermined service provider. As will be later described in greater detail, the first network device may use the MAC addresses of the headend network devices to ARP proxy requests from network entities such as CPEs associated with the first network device.

At step 108, the first network device stores the transmission termination parameters and the SPD parameters received in the first modified message. At step 110, the first network device establishes an upstream link connectivity using the transmission termination parameters received in the first message. In one embodiment, the first network device sets up one of its network interfaces (transmission ports) to serve as an upstream link network interface (an upstream link port) based on the type of the upstream connection specified in the first message.

In the exemplary method 100, the first network device is the CM 16, the second network device is the CMTS 12, the downstream connection type is the cable network connection 14, the upstream connection type is the Ethernet network connection 20, the network interface is an Ethernet port, and the termination router is the HRE 28. Further, the first message is a Telephony Channel Descriptor ("TCD") message, described in a greater detail hereinafter. The method 100 has been described in reference to network devices shown in FIG. 1. However, it should be understood that the present invention is not limited to these network devices, and more, fewer and equivalent network devices could also be employed to carry out the described method. For example, the present invention is not limited to the Ethernet upstream return, and other types of upstream returns such as a wireless return could also be used. Further, unless specified to the contrary, the steps of the flow chart may be taken in sequence other than that described, and more or fewer steps could also be used.

Figure 4:
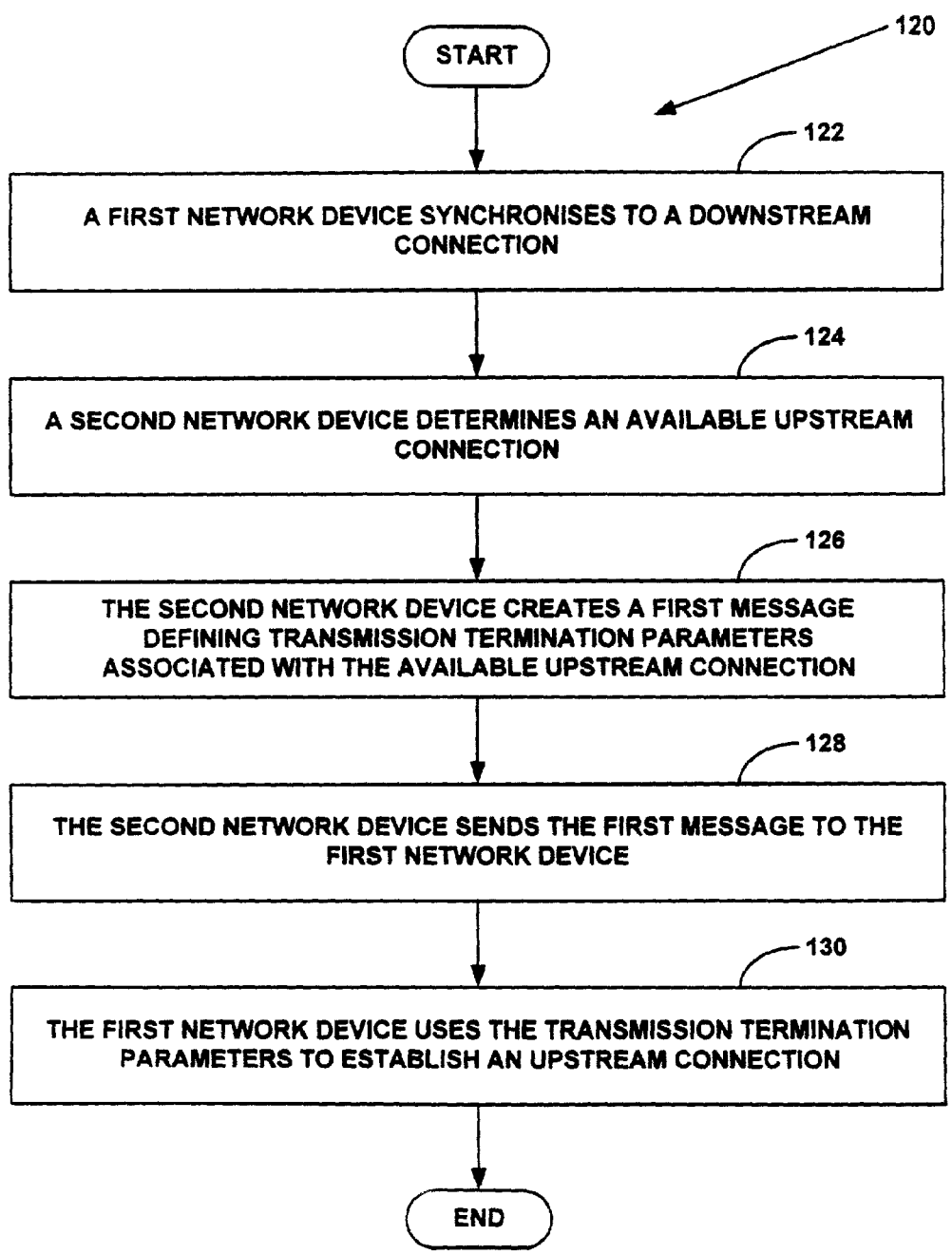
FIG. 4 is a flow chart illustrating an exemplary method for creating a message defining upstream termination parameters on a network device.

FIG. 4 is a flow chart illustrating a method 120 for providing a special configuration parameter set to a network device in a data-over-cable system having a special return path. At step 122, once a first network device is powered on, the first network device scans for downstream connections such as downstream channels on a first network and synchronizes to one of the downstream channels. Once the first network device synchronizes to a downstream channel, at step 124, a second network device associated with that channel determines upstream connections available on a second network.

At step 126, the second network device creates a first message defining transmission termination parameters such as a headend router information parameters and an upstream link type to be used by the first network device. In one embodiment, the second network device stores information of all available headend routers and monitors their availability. The headend routers terminate the upstream connection and forward data from the first network device to a data network. In one embodiment, the first message includes a parameter defining an upstream connection type that should be used by the first network device so that the first network device can automatically set up an upstream link based on the received connection type parameter. For example, the first network device may set up an upstream link to one a predetermined network interface (a predetermined port) based on the upstream connection type defined in the first message. Further, according to an exemplary embodiment, the second network device defines headend router data in the first message. In one embodiment, the first message specifies a network address such as a MAC address of a designated router. However, more than one network addresses of headend routers may be specified in the first message. In one embodiment, each headend router may be associated with a predetermined service provider, so that the first network device may use the received network addresses in ARP proxy process that will be later described in greater detail.

At step 128, the second network device sends the first message to the first network device. Upon the receipt of the first message, the first network device may establish an upstream communication link using the parameters received in the first message, as shown at step 130. According to an exemplary embodiment, the first network device may establish the upstream link by setting a predetermined network interface (port) to an upstream connection network interface.

According to an exemplary embodiment, the first network device is the CM 16, the second network device is the CMTS 12, the headend router is the HRE 28.

Further, the downstream channel is a cable network downstream channel, the upstream link is an upstream link via the Ethernet network 20 and the optical network 24. Further, the first message is a TCD message, and the predetermined network interface is an Ethernet port.

The method 120 has been described in reference to network devices shown in FIG. 1. However, it should be understood that the present invention is not limited to these network devices, and more, fewer and equivalent network devices could also be employed to carry out the described method. For example, the present invention is not limited to the Ethernet upstream return, and other types of upstream returns such as a wireless return could also be used. Further, unless specified to the contrary, the steps of the flow chart may be taken in sequence other than that described, and more or fewer steps could also be used.

Figure 5:
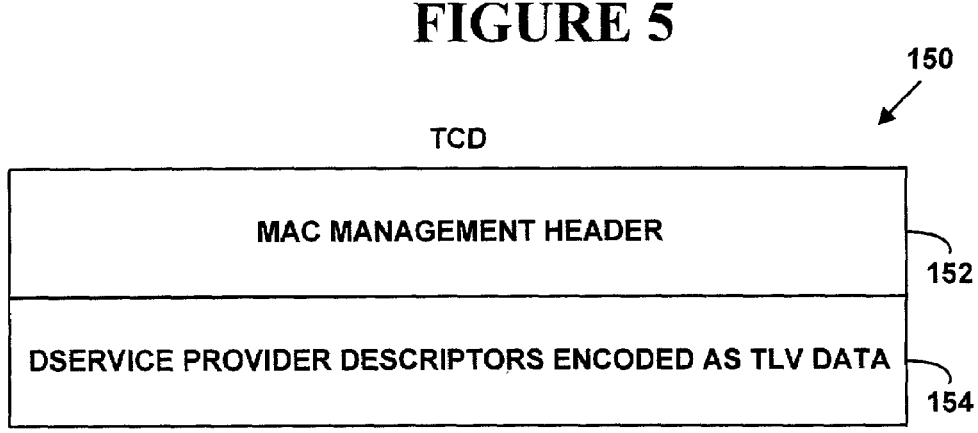
FIG. 5 is a block diagram illustrating a Termination Channel Descriptor message structure.

FIG. 5 is a block diagram illustrating a TCD message structure 150 according to one exemplary embodiment. As shown in FIG. 5, the TCD message 150 includes two parts: a MAC management header 152 and Service Provider Descriptors ("SPDs") portion 154. In one embodiment, the parameters in the SPDs portion 154 are encoded in a Type/Length/Value ("TLV") form. However, other encoding techniques could also be used. In one embodiment, the TCD message contains a set of SPDs defining a set of transmission termination parameters associated with a special return link such as an Ethernet link. According to an exemplary embodiment, the TCD message 150 includes a plurality of SPDs. Table 1 illustrates an exemplary set of TLV encoded parameters. However, more, fewer, or different parameters could also be used in the SPD 154.

TABLE 1

| Name | Type (1 byte) | Length (1 byte) | Value ('Length' bytes) |
| --- | --- | --- | --- |
| Factory Default Flag | 1 | 1 | Boolean |
| Service Provider Name | 2 | Variable | Service Provider String (optional) |
| Phone Number1 | 3 | 2 | ASCII character zero '0' (required) null appended |
| Phone Number2 | 4 | 7 | MAC address of destination HRE (required) null appended |
| Phone Number3 | 5 | Variable | Not used |
| Connection Threshold | 6 | Variable | Not used |
| Username | 7 | Variable | Username String (optional) |
| Password | 8 | Variable | Password String (optional) |
| DHCP Authenticate | 9 | 1 | DHCP authenticate Boolean (optional) |
| DHCP IP Address | 10 | 4 | DHCP IP address (required) |
| RADIUS Realm | 11 | Variable | Realm String (optional) |
| PPP Authentication | 12 | 1 | PPP authentication: (0) Negotiate PAP/CHAP, Use only PAP (1), Use only CHAP(2) (optional) |

The Factory Default Flag parameter shown in Table 1 has a Boolean value, and if the Boolean value is TRUE, it indicates that the SPD should be used by the CM 16 during a factory default procedure. In one embodiment, the factory defaults are used when the CM 16 is initially powered on, or when a user or an administrator resets the CM 16. The Service Provider Name parameter includes a name of a service provider. In one embodiment, the Phone Number1, Phone Number2 and Phone Number3 parameters are used to define upstream transmission termination parameters and further define a mode of operation of the CM 16. The Phone Number1 (a primary dial string) contains a flag value in the ASCII string. For example, according to an exemplary embodiment, the ASCII string represents a zero value that denotes an Ethernet mode for the CM 16. Further, a predetermined value in the Phone Number1 field may denote both a telephony return capability as well as an Ethernet-return capability. However, the present invention is not limited to defining an Ethernet mode in the primary string, and different modes could also be specified, such as a wireless mode. The Phone Number2 parameter that is a secondary string denotes a transmission termination router address associated with the upstream connection. In one embodiment, the Phone Number2 parameter may contain a 6-byte Ethernet address of the HRE 28. The Phone Number2 may define a plurality of network addresses of HREs, and each network address may be associated with a predetermined service provider. Further, the present invention is not limited to the Ethernet return system, and other types of return systems could also be used such as a wireless system, for example.

Further, as shown in Table 1, the Phone Number3 parameter and the Connection Threshold parameter are not defined according to an exemplary embodiment. The Username parameter contains a username that the CM 16 uses during a Password Authentication Protocol ("PAP"), or a Challenge Handshake Authentication Protocol ("CHAP") during the initialization procedure. However, if this parameter is not present, a default value could be a "guest", for example. Further, the Password parameter includes a password that the CM 16 uses during the initialization process. However, if this parameter is not specified, a default password could also be used. The Dynamic Host Configuration Protocol ("DHCP") Authenticate parameter indicates whether the CM 16 should use a DHCP server specified in the DHCP IP Address parameter. The RADIUS Realm parameter includes an ASCII string that defines a RADIUS server domain. A format of the RADIUS Realm parameter is a monolithic sequence of alphanumeric characters in an ACSII string composed of numbers and letters. The PPP Authentication parameter instructs the CM 16 to perform a predetermined authentication procedure such as the PAP procedure or the CHAP procedure.

Figure 6:
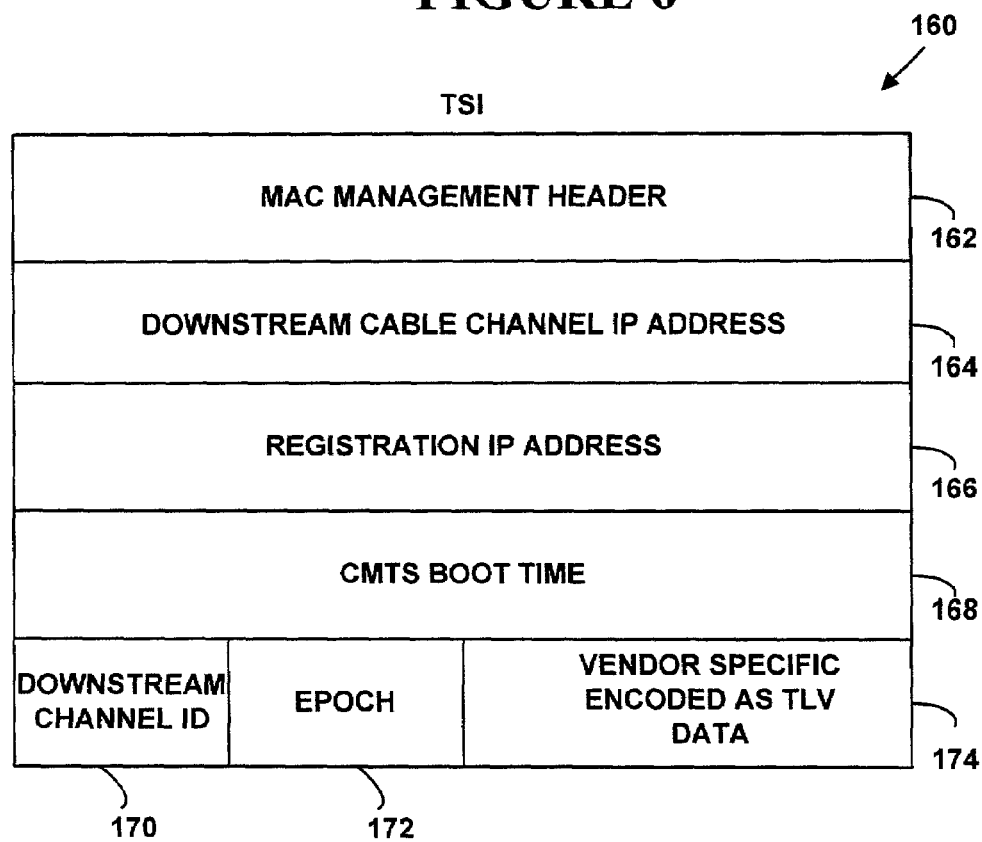
FIG. 6 is a block diagram illustrating a Termination System Information message structure.

Additionally, during the initialization procedure, the CMTS 12 transmits a Termination System Information ("TSI") message to the CM 16. The CMTS 12 periodically transmits the TSI message in order to report CMTS information, such as a CMTS boot record, to the CM 16. In one embodiment, the TSI message is transmitted as a MAC management message, and it has a MAC management type value of 17. FIG. 6 illustrates an exemplary TSI message structure 160. The TSI message structure 160 includes a MAC Management Header field 162, a Downstream Channel IP address field 164, a Registration IP Address field 166, a CMTS Boot Time field 168, a Downstream Channel ID field 170, an Epoch field 172 and a Vendor Specific TLV Encoded Data field 174.

In one embodiment, the Downstream Channel IP Address field 162 includes an IP address of the CMTS 12 available on a downstream channel on which the TSI message 160 has arrived. The Registration IP Address field 166 contains an IP address that the CM 16 should use to send its registration messages. The CMTS Boot Time field 168 specifies an absolute time of a CMTS 12 recorded epoch. The Downstream Channel ID field 170 includes an identifier of the downstream channel on which the TSI message 160 has been transmitted. The identifier specified in the field 170 could be an identifier arbitrarily chosen by the CMTS 12 and is unique within the MAC sub-layer domain. The Epoch field 172 includes an integer value that is incremented each time the CMTS 12 is re-initialized or performs an address or routing table flush. In one embodiment, if there is no previous epoch value, the CMTS 12 may use a default value of one. The Vendor Specific Encoded TLV Data field includes optional vendor extensions.

According to an exemplary embodiment, after receiving the TCD and TSI messages, the CM 16 establishes Ethernet connectivity. The CM 16 may set up an Ethernet link to its Ethernet port so that upstream traffic is forwarded to the HRE 28 unicast destination MAC address that has been specified in the TCD message 150. In one embodiment, to establish a communication session with the HRE 28, the PAP authentication or the CHAP authentication may be used during the authentication process.

Dynamic Network Host Configuration

As illustrated in FIG. 2., the CM 16 includes a Dynamic Host Configuration Protocol ("DHCP") layer 66, hereinafter a DHCP 66. As is known in the art, the DHCP 66 is used to provide configuration parameters to hosts on a data network such as an IP network, for example. The DHCP 66 consists of two components: a protocol for delivering host-specific configuration parameters from a DHCP server to a host, and a mechanism for allocating network host addresses to hosts. The DHCP is built on a client-server model, where designated DHCP servers allocate network host addresses and deliver configuration parameters to dynamically configure network host clients.

Figure 7:
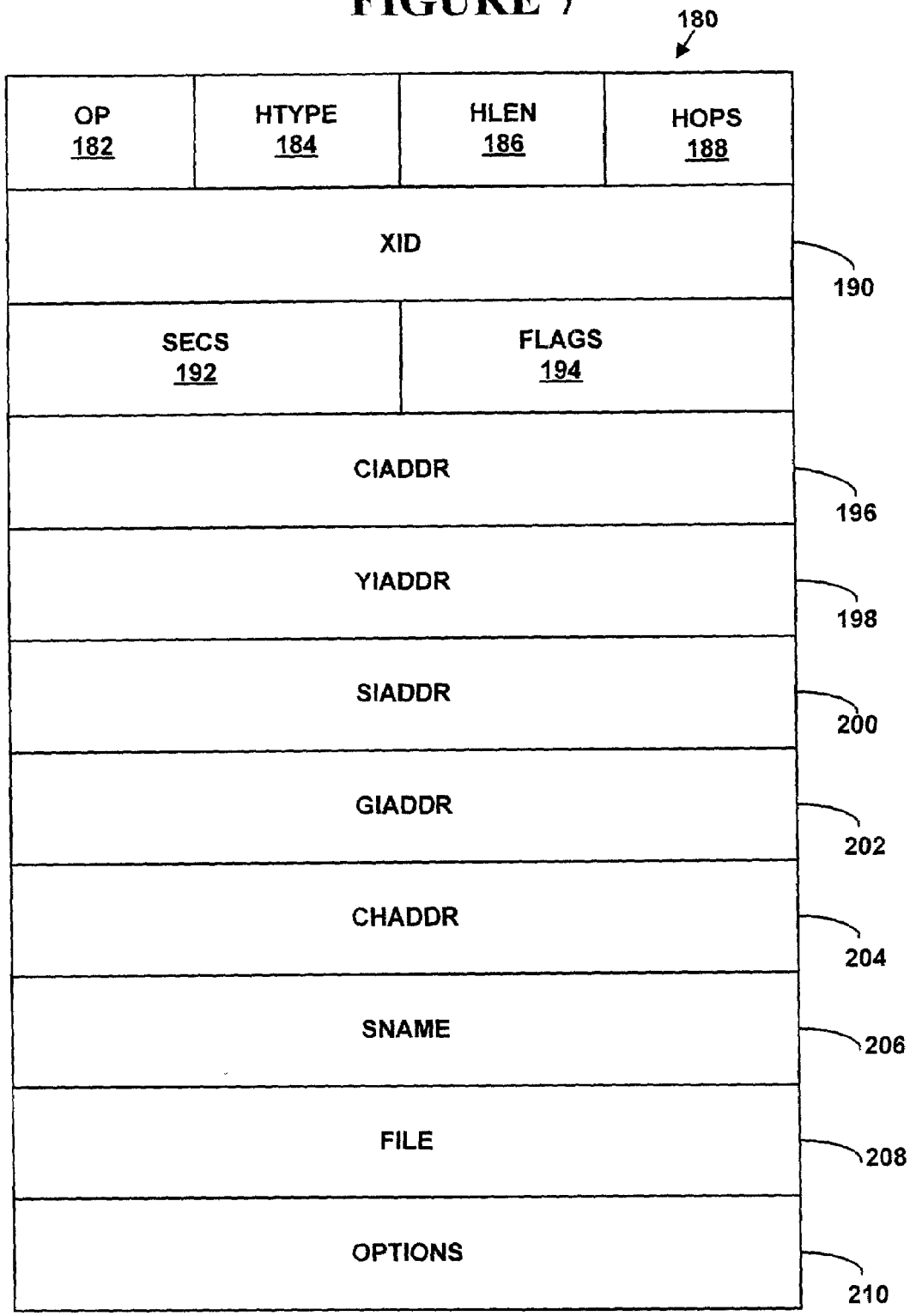
FIG. 7 is a block diagram illustrating an exemplary Dynamic Host Configuration Protocol message structure.

FIG. 7 is a block diagram illustrating an exemplary DHCP message structure 180. The format of the DHCP message structure 180 is based on a format of BOOTstrap Protocol ("BOOTP") messages described in RFC-951 and RFC-1542 that may be found at the URL "www.ietf.org". From a network host client's point of view, the DHCP is an extension of a BOOTP mechanism. This property allows the existing BOOTP clients to communicate with DHCP servers without requiring any changes to network host clients' BOOTP initialization software.

To capture a BOOTP relay agent behavior described as part of the BOOTP specification and to allow interoperability of existing BOOTP clients with the DHCP servers, a DHCP server uses a BOOTP message format. Further, using the BOOTP relay agents eliminates the necessity of using a DHCP server on each physical network segment.

DHCP 66 message structure 180 includes an operation code field 182 ("op"), a hardware address type field 184 ("htype"), a hardware address length field 186 ("hlen"), a number of hops field 188 ("hops"), a transaction identifier field 190 ("xid"), a seconds elapsed time field 192 ("sees"), a flags field 194 ("flags"), a client IP address field 196 ("ciaddr"), a your IP address field 198 ("yiaddr"), a server IP address field 200 ("siaddr"), a gateway/relay agent IP address field 202 ("giaddr"), a client hardware address field 204 ("chaddr"), an optional server name field 206 ("sname"), a boot file name 208 ("file") and an optional parameters field 210 ("options"). Descriptions for an exemplary DHCP message 180 fields are shown in Table 2.

TABLE 2

| DHCP Parameter | Description |
| --- | --- |
| OP 182 | Message op code/message type. 1 = BOOTREQUEST, 2 = BOOTREPLY. |
| HTYPE 184 | Hardware address type (e.g., '1' = 10 Mps Ethernet). |
| HLEN 186 | Hardware address length (e.g. '6' for 10 Mbps Ethernet). |
| HOPS 188 | Client sets to zero, optionally used by relay-agents when booting via a relay-agent. |
| XID 190 | Transaction ID, a random number chosen by the client, used by the client and server to associate messages and responses between a client and a server. |
| SECS 192 | Filled in by client, seconds elapsed since client started trying to boot. |
| FLAGS 194 | Flags including a BROADCAST bit. |
| CIADDR 196 | Client IP address; filled in by client in DHCPREQUEST if verifying previously allocated configuration parameters. |
| YIADDR 198 | 'Your'(client) IP address. |
| SIADDR 200 | IP 54 address of next server to use in bootstrap; returned in DHCPOFFER, DHCPACK and DHCPNAK by server. |
| GIADDR 202 | Gateway relay agent IP 54 address, used in booting via a relay-agent. |
| CHADDR 204 | Client hardware address (e.g., MAC layer 44 address). |
| SNAME 206 | Optional server host name, null terminated string. |
| FILE 208 | Boot file name, terminated by a null string. |
| OPTIONS 210 | Optional parameters. |

The DHCP message structure shown in FIG. 7 is used to discover IP and other network host interfaces in data-over-cable system 10. A network host client such as the CM 16 uses the DHCP process to acquire or verify an IP address and network parameters.

Figure 8:
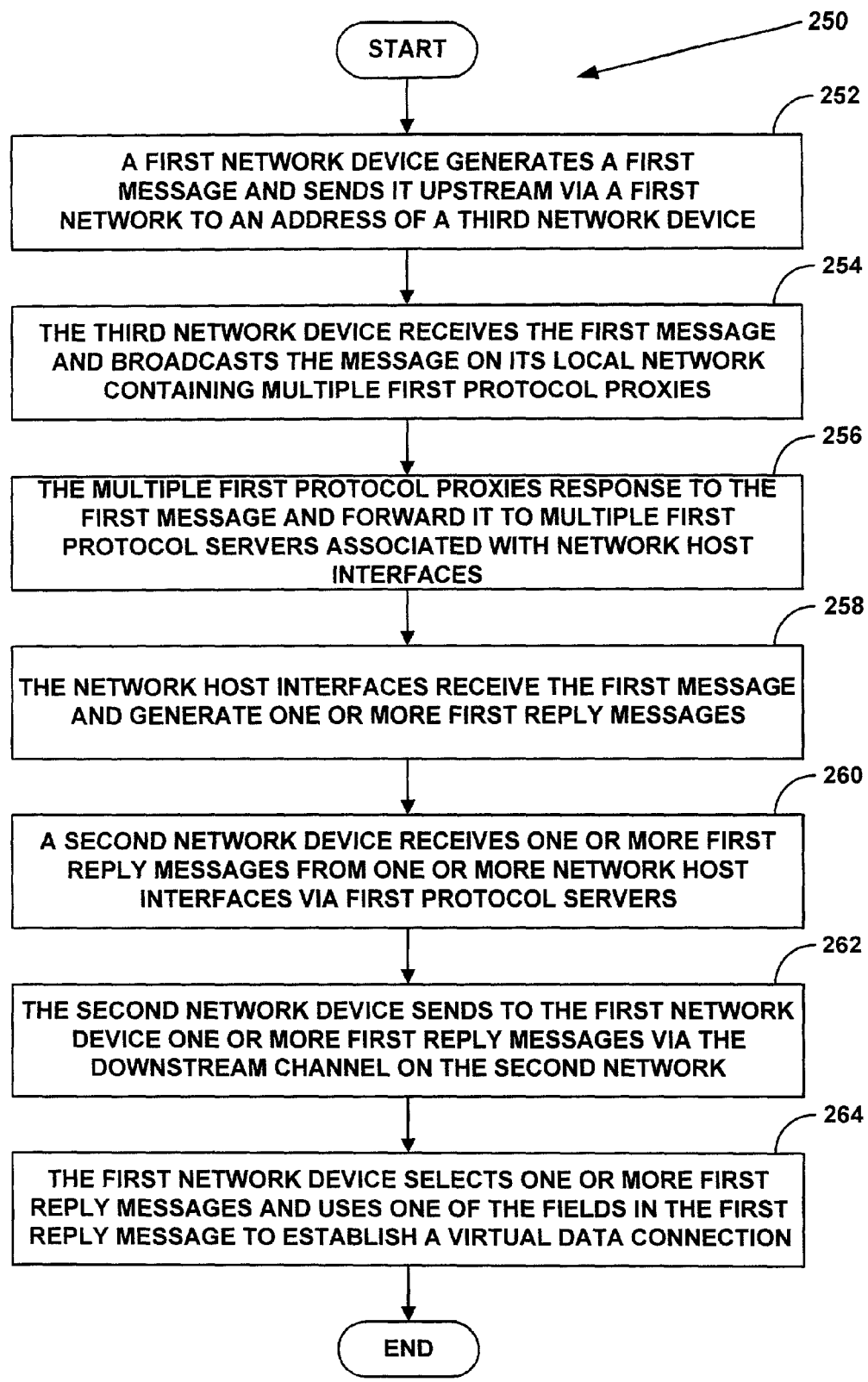
FIG. 8 is a flow chart illustrating an exemplary method for discovering network host interfaces on a data network.

FIG. 8 is a flow chart illustrating a method 250 for discovering network host interfaces in the Ethernet-return cable network 10. When a first network device establishes an IP link to a third network device, and upon a receipt of transmission termination parameters via a downstream connection on a second network from a second network device, at step 252, the first network device generates a first message and sends it upstream via a first network to a third network device.

According to an exemplary embodiment, the first message is used to discover one or more IP host interfaces available on the second network device. The first message may include a plurality of fields, and one of the fields defines a downstream channel IP address obtained in one of the initialization messages such as the TSI message, for example. Table 3 illustrates exemplary fields of the first message including a DHCP message. However, the exemplary embodiment is not limited to DHCP messages or message fields shown in Table 3, and more, fewer, different or equivalent messages and message fields could also be used.

TABLE 3

| DHCP Parameter | Description |
| --- | --- |
| OP 182 | Set to BOOTREQUEST. |
| HTYPE 184 | Set to network type (e.g., one for 10 Mbps Ethernet). |
| HLEN 186 | Set to network length (e.g., six for 10 Mbps Ethernet) |
| HOPS 188 | Set to zero. |
| FLAGS 194 | Set BROADCAST bit to zero. |
| CIADDR 196 | If CM 16 has previously been assigned an IP address, the IP address is placed in this field. If CM 16 has previously been assigned an IP address by DHCP, and also has been assigned an address via IPCP, CM 16 places the DHCP IP address in this field. |
| GIADDR 202 | CM 16 places the Downstream Channel IP address of CMTS 12 obtained in TSI message on a cable downstream channel in this field. |
| CHADDR 204 | CM 16 places its 48-bit MAC address in this field. |

At step 254, the third network device receives the first message and broadcasts the first message on its local network. In one embodiment, the third network device includes connections to one or more network host interface proxies that may accept first protocol messages from the first network device to first protocol servers that are connected to network host interfaces available on the second network device. At step 256, one or more network host interface proxies intercept the first message from the first network device and forward it to one or more first protocol servers associated with the network host interfaces available on the second network device.

At step 258, one or more first protocol servers receive the first message and generate one or more first reply messages. The one or more first reply messages are offer messages that define configuration parameters. According to an exemplary embodiment, the one or more offer messages are DHCP messages, and exemplary fields of the one or more first offer messages are shown in Table 4. However, other field settings could also be used.

TABLE 4

| DHCP Parameter | Description |
| --- | --- |
| FLAGS 194 | BROADCAST bit set to zero. |
| YIADDR 198 | IP address from a network host interface to allow CM 16 to receive data from data |

TABLE 4-continued

| DHCP Parameter | Description |
| --- | --- |
| | network via a network host interface available on CMTS 12. |
| SIADDR 200 | An IP address for a TFTP server to download configuration information for an interface host. |
| CHADDR 204 | MAC address of CM 16. |
| SNAME 206 | Optional DHCP server identifier with an interface host. |
| FILE 208 | A TFTP configuration file name for CM 16. |

If one or more first protocol servers can offer required services to the first network device, the first protocol servers send the reply message to an address specified in the first message. The first message may specify an address of a downstream connection associated with the second network device. As shown in Table 3, the address of the downstream channel is specified in a "giaddr" field.

At step 260, the second network device receives one or more first reply messages from one or more first protocol servers associated with the network host interfaces. In one embodiment, the second network device examines the first reply messages and sends the first reply messages to the first network device via the downstream connection on the second network. According to an exemplary embodiment, the first reply messages include the MAC address of the first network device on the downstream connection of the second network.

When the first network device receives the one or more first reply messages on the downstream connection from the second network device, at step 264, the first network device selects one or more first reply messages from the network host interfaces that responded to the first message. According to an exemplary embodiment, each first reply message contains a network host interface address on the second network device via which the first network device can receive data from a third network. The first network device acknowledges the receipt of the one or more first reply messages with a first protocol sequence described in a greater detail below.

According to an exemplary embodiment associated with the method 250, the first network device is the CM 16, the second network device is the CMTS 12, the third network device is the HRE 28, the first network is the Ethernet network 20, the second network is the cable network 14, and the third network is the data network 34. Further, the first message is a DHCPDISCOVER message, the first reply messages are DHCPOFFER messages, and the first protocol servers are DHCP servers. However, the method 250 is not limited to the Ethernet-return system shown in FIG. 1, and it could be employed in other types of systems such as a wireless-return cable system, for example. Further, the exemplary method 250 is not limited to these network devices, and fewer, more, different or equivalent network devices could also be used.

Figure 9:
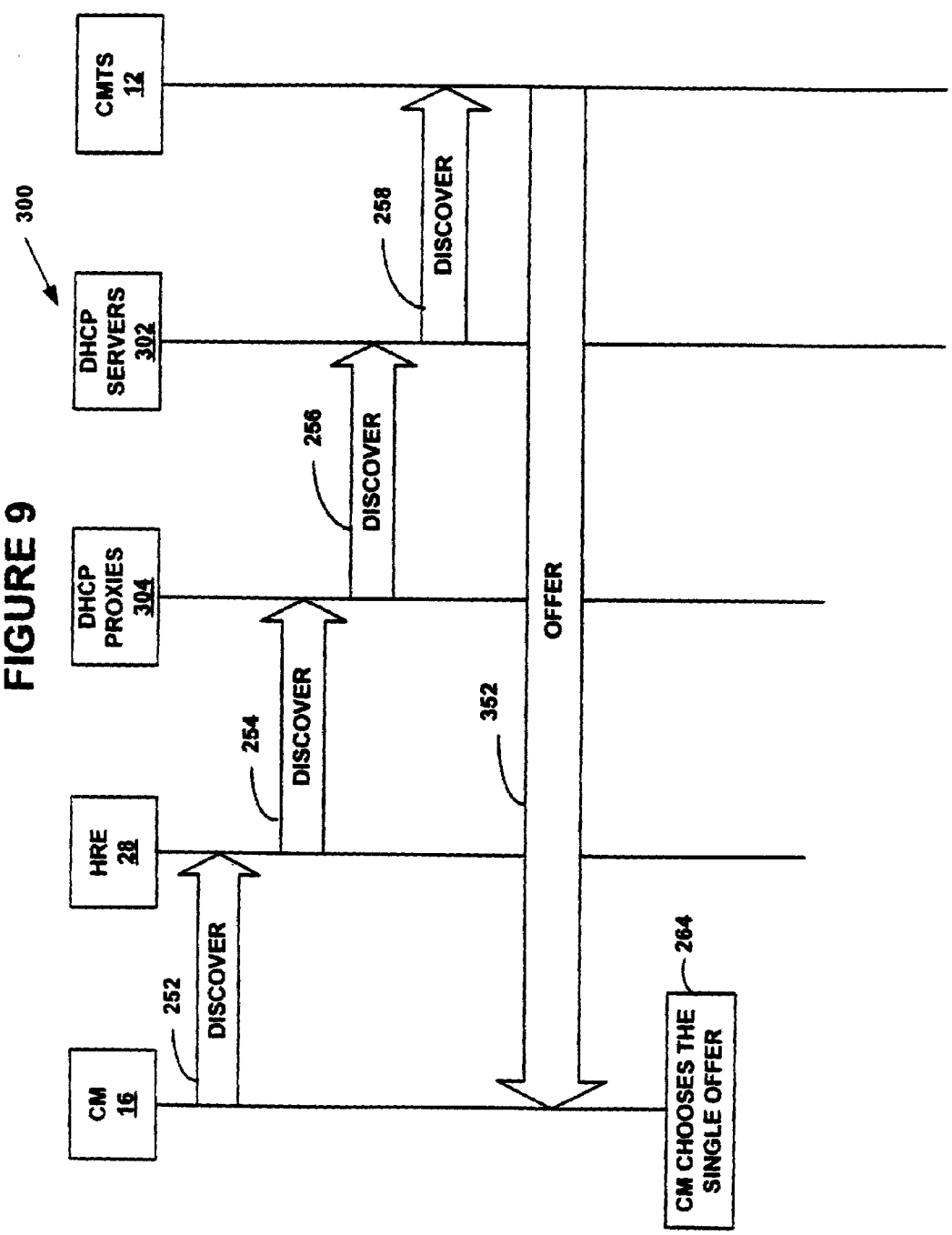
FIG. 9 is a block diagram illustrating a message flow for discovering hosts on a network.

FIG. 9 is a block diagram illustrating a message flow 300 in an Ethernet-return data-over-cable system for the method 250 illustrated in FIG. 8. Steps 252, 254, 256, 258, 262 and 264 of the method 250 are illustrated in FIG. 9. The system 300 includes DHCP proxies 304 and DHCP servers 302. FIG. 9 illustrates multiple DHCP proxies 304 and DHCP servers 302. FIG. 9 illustrates DHCP proxies 304 separate from the HRE 28. However, in one embodiment, the HRE 28 may include DHCP proxy functionality, and no separate proxies are used. In such an embodiment, the HRE 28 forwards DHCP messages to the DHCP servers 302 available on the CMTS 12.

Resolving Addresses of Network Host Interfaces

Figure 10:
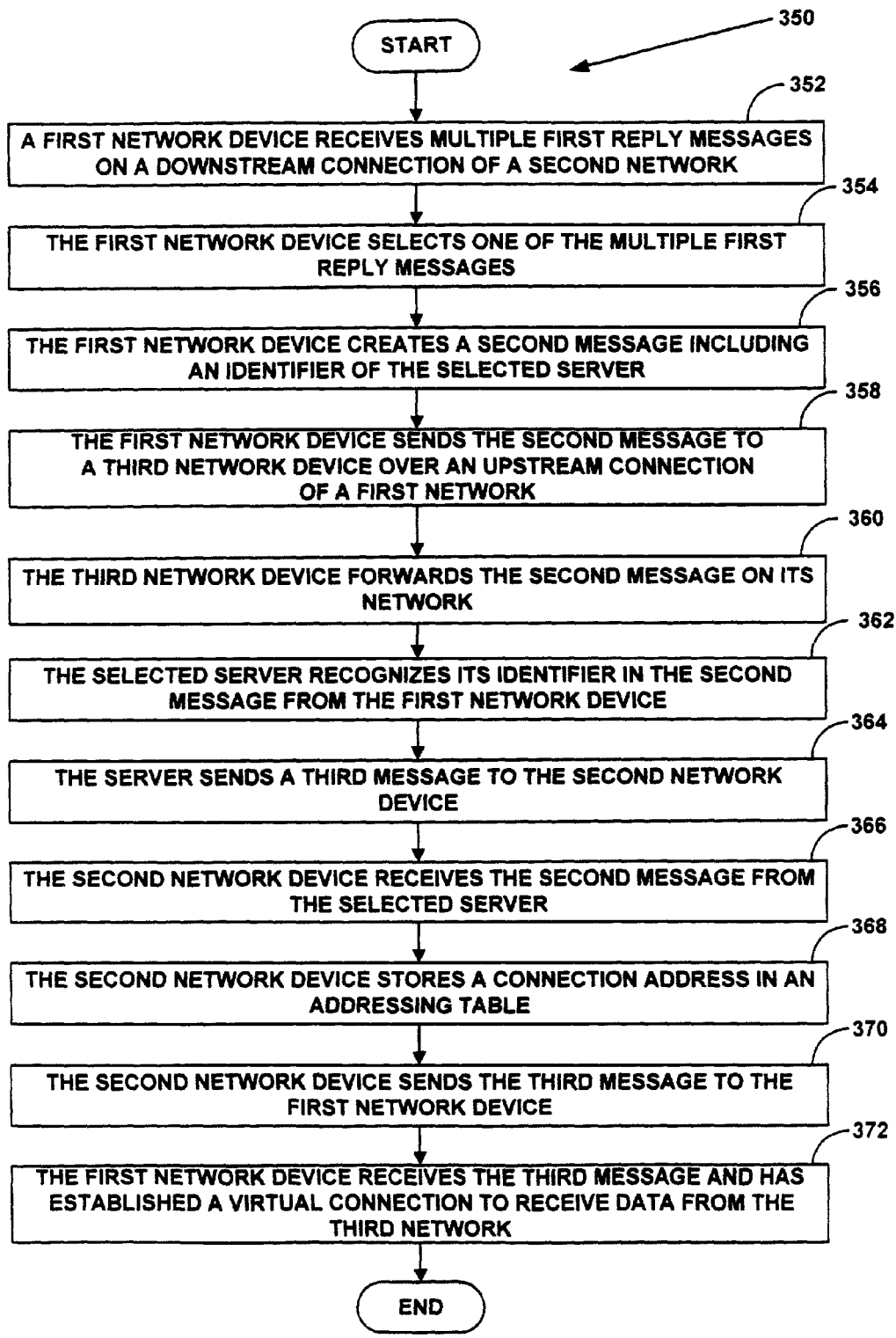
FIG. 10 is a flow chart illustrating a method for resolving network hosts on a network.

According to an exemplary embodiment, since a network device receives multiple DHCPOFFER messages (step 262 in FIG. 8), the network device resolves and acknowledges one offer from a selected network host interfaces. FIG. 10 is a flow chart illustrating an exemplary method 350 for resolving and acknowledging host addresses in an Ethernet-return data-over-cable system.

At step 352, a first network device receives multiple first reply messages on a downstream connection of a second network from a second network device. The multiple reply messages are offers from one or more network host interfaces available on a second network device to provide a connection of the first network device with a third network. At step 354, the first network device selects one of the multiple first reply messages. At step 356, the first network device creates a second message with a second message type to accept the offered services from a selected network host interface. In one embodiment, one of the fields in the second message includes a server identifier that was specified in the selected first reply message. The second message may include a DHCPREQUEST message, and Table 5 illustrates exemplary fields of the second message. However, fewer, more, different or equivalent field settings could also be used.

TABLE 5

| DHCP Parameter | Description |
| --- | --- |
| OP | Set to BOOTREQUEST. |
| HTYPE | Set to network type (e.g., one for 10 Mbps Ethernet). |
| HLEN | Set to network length (e.g., six for 10 Mbps Ethernet) |
| HOPS | Set to zero. |
| FLAGS | Set BROADCAST bit to zero. |
| CIADDR | If CM 16 has previously been assigned an IP address, the IP address is placed in this field. If CM 16 has previously been assigned an IP address by DHCP, and also has been assigned an address via IPCP, CM 16 places the DHCP IP address in this field. |
| YIADDR | IP address sent from the selected network interface host in DCHPOFFER message |
| GIADDR | CM 16 places the Downstream Channel IP address CMTS 12 obtained in TSI message on a cable downstream channel in this field. |
| CHADDR | CM 16 places its 48-bit MAC LAN address in this field. |
| SNAME | DHCP server identifier for the selected network interface host |

At step 358, the first network device sends the second message to a third network device over an upstream connection on a first network. Once the third network device receives the second message with the second message type, at step 360, the third network device broadcast the second message on its local network. At step 362, a first protocol server identified in the second message recognizes its identifier in the second message sent from the first network device. At step 364, the first protocol server sends a third message to the second network device. The third message is an acknowledgement message for the first network device that the selected network host interface received the second message. At step 366, the second network device receives the third message and, at step 368, the second network device stores a connection address in one or more routing tables. The third message is a DHCPACK message, and its "yiaddr-field" contains an address of a network host interface that is used for receiving data from the second network device destined to the first network device. Further, the "chaddr-field" in the third message includes the MAC address of the CM 16. Using the data stored in the routing tables, the second network device may forward data from the third network to the first network device when the data is received on the network host interface associated with the second network device.

At step 370, the second network device sends the third message to the first network device via a downstream connection on the second network. At step 372, the first network device receives the third message from the second network device. Once the first network device receives the third message, the first network device has the necessary addresses to establish a virtual connection that allows data to be sent from the third network to a network host interface associated with the second network device, and from the second network device over the downstream connection to the first network device.

In the event that the first network device is not compatible with the configuration of the network host interface received in the third message, the first network device may generate a fourth message defining a decline and, further, the first network device may forward the fourth message to the third network device via the first network. In such an embodiment, the third network device may forward the fourth message to the second network device that upon a reception of the fourth message may flash its routing tables to remove invalid address pairing.

According to an exemplary embodiment associated with the method 350, the first network device is the CM 16, the second network device is the CMTS 12, the third network device is the HRE 28, and the first protocol server is a DHCP server. Further, the first network is the Ethernet network 20, the second network is the cable network 14, and the third network is the data network 34. Further, the first reply messages are DHCPOFFER messages, the second message is a DHCPREQUEST message, the third message is a DHCPACK message, and the fourth message is a DHCPDECLINE message. However, the exemplary embodiment associated with the method 350 is not limited to these network devices, messages or protocols, and different or equivalent network devices, messages or protocols could also be used. Further, the exemplary embodiment is not limited to the Ethernet-return data-over-cable network, and other types of returns could also be used such as an HPNA return or a wireless return.

Figure 11:
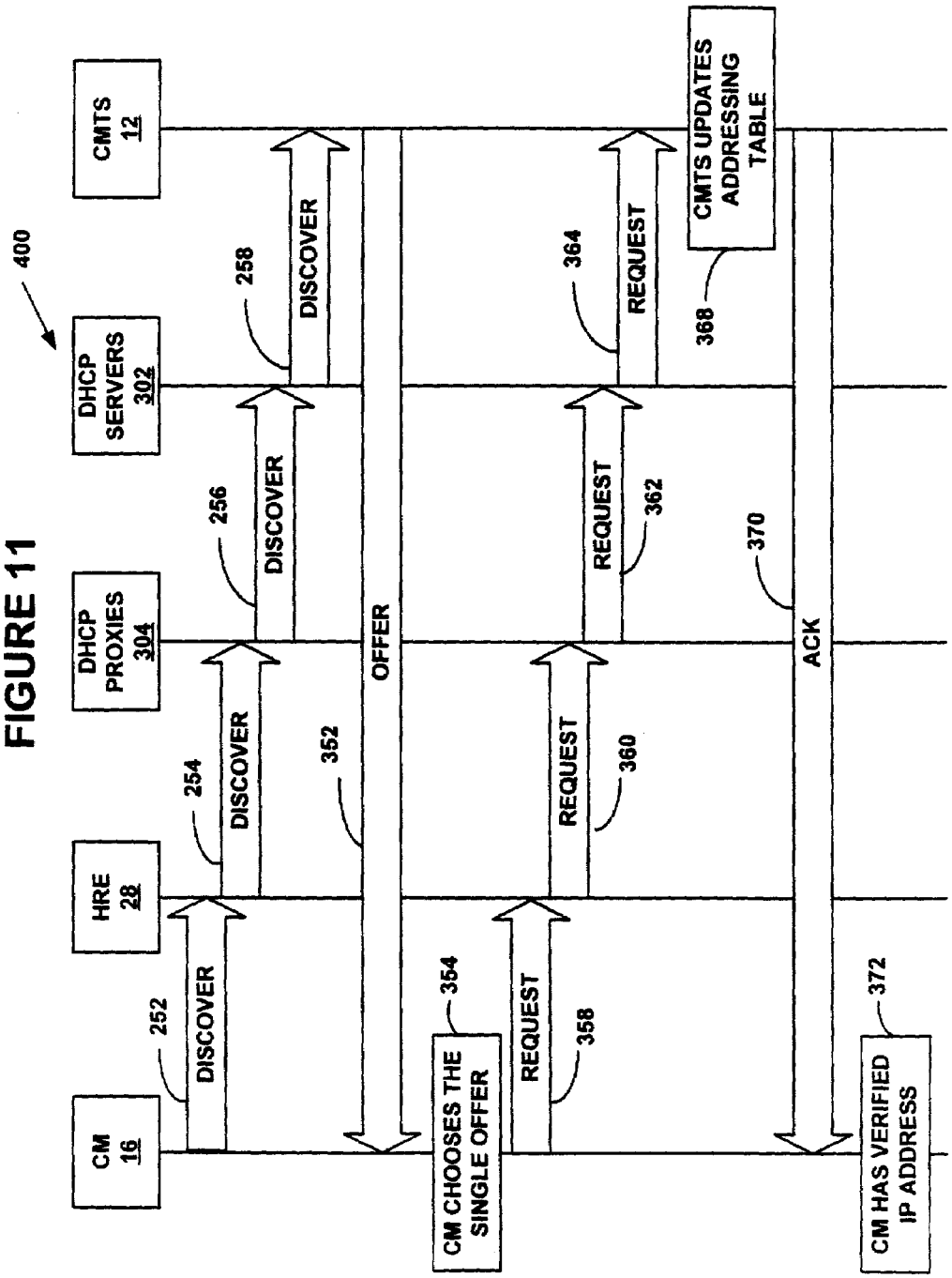
FIG. 11 is a block diagram illustrating a message flow for resolving network hosts on a network.

FIG. 11 is an exemplary block diagram illustrating a message flow 400 of the method 350 illustrated in FIG. 10. The message flow 400 illustrates DHCP proxies 304 and DHCP servers 302. However, in one embodiment, the DHCP proxies 304 are not separate entities, but they are included in the HRE 28. In such an embodiment, the DHCP proxy services are provided directly by the HRE 28. FIG. 11 illustrates the method steps 352, 354, 358, 360, 362, 364, 368, 370 and 372 of the method 350 shown in FIG. 10.

CPE Initialization in an Ethernet Return Data-Over-Cable System

Figure 12:
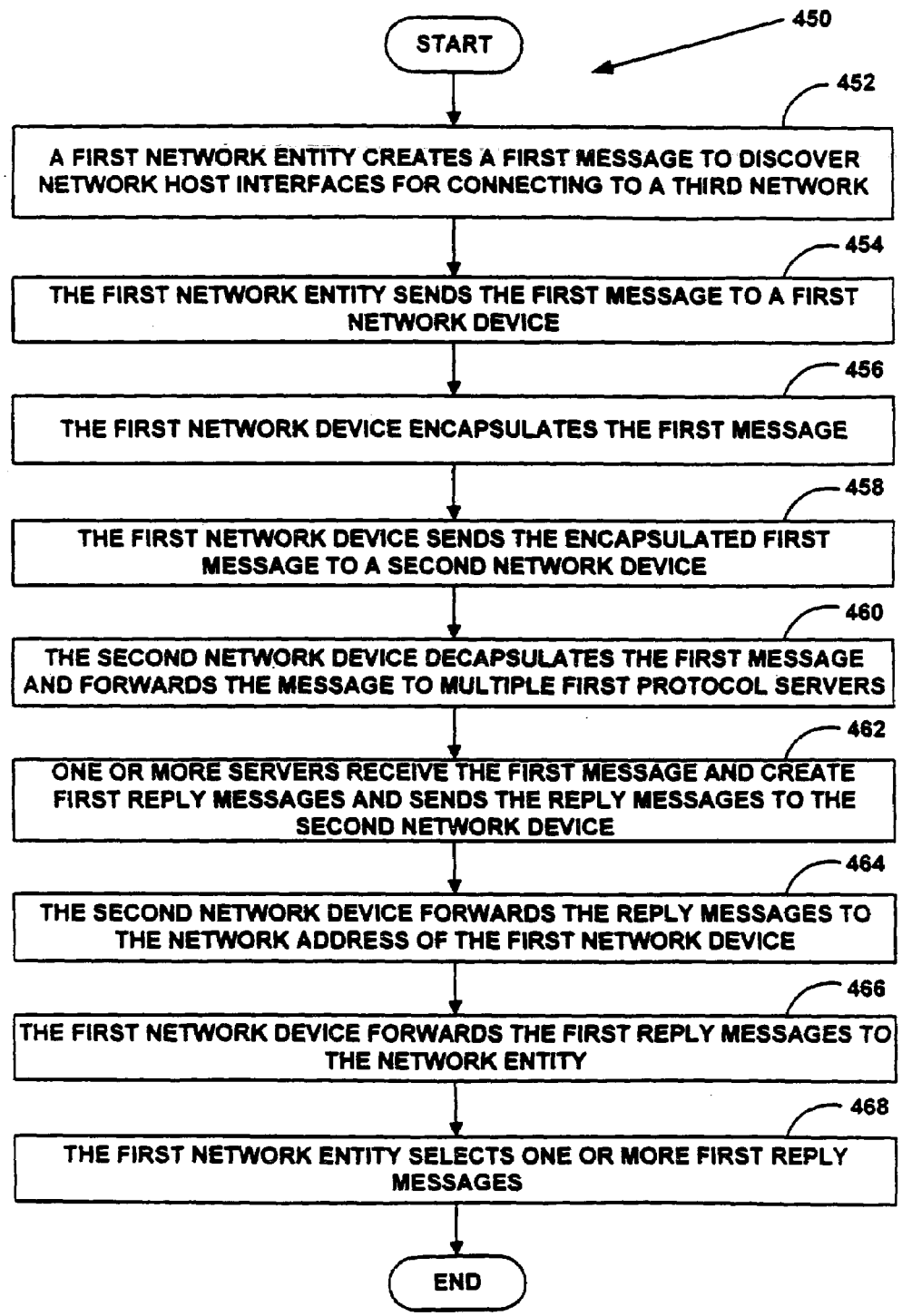

The CPE 18 also uses a DHCP process to generate requests for IP addresses so that the CPE 18 can receive data from the data network 34 via the CM 16. In one embodiment, the CM 16 functions as an IP forwarder to facilitate an access of the CPE 18 to DHCP servers. FIG. 12 is a flow chart illustrating an exemplary method 450 for obtaining addresses for customer premises equipment entities.

Referring to step 452, a network entity creates a first message to discover a network host interface address associated with a second network device on a second network so that a virtual connection to a third network is established. At step 454, the network entity sends the first message to a first network device that functions as a relay agent. When the first network device receives the first message, at step 456, the first network device encapsulates the first message into a predetermined frame format. For example, the frame includes a source IP address and a destination IP address. In one embodiment, the source IP address may include an IP address of the first network device, and the destination IP address may include an IP address of a downstream channel associated with the second network device and the encapsulated first message. Further, the frame may include a field that defines a predetermined port number and a checksum that may be used to verify that the data in the first message arrived intact. At step 458, the first network device sends the encapsulated first message to a second network device.

At step 460, the second network device decapsulates the first message and forwards it to multiple first protocol servers. Further, when the second network device receives the first message, the second network device determines whether a connection address is included in one of the fields in the first message. If the connection address is not in the first message, the second network device puts its own downstream connection address into the first message. Further, the second network device may verify the integrity of the first message. In one embodiment, if the first message fails certain integrity checks, the second network device may drop the first message.

At step 462, one or more first protocol servers receive the first message and create one or more first reply messages. Further, the one or more first protocol servers send the first reply messages to the second network device. At step 464, the second network device sends the reply messages to the first network device. According to an exemplary embodiment, since the first network device is a forwarder, the second network device sends the first reply messages to the first network device using a network address of the first network device.

At step 466, the first network device forwards the first reply messages to the first network entity. In one embodiment, the first network device forwards the first reply messages to a network interface associated with the first network entity. According to an exemplary embodiment, if broadcast bits in the first reply messages are set, the first network device sends the first reply messages to a broadcast IP address such as 255.255.255.255, for example. At step 468, the first network entity receives the first reply messages and selects one of the messages to establish a virtual connection from the first network entity to the third network.

According to an exemplary embodiment associated with the method 450, the first network entity is the CPE 18, the first network device is the CM 16, the second network device is the CMTS 12, and the first protocol servers are DHCP servers. Further, the first network is the Ethernet network 20, the second network is the cable network 14 and the third network is the data network 34. Further, the first message is a DHCPDISCOVER message, the encapsulated first message is a DHCPDISCOVER message encapsulated in an User Datagram Protocol ("UDP") format, the first reply messages are the DHCPOFFER messages. However, the exemplary method 450 is not limited to these network devices, messages or protocols, and other network devices, messages or protocols could also be used.

Figure 13:
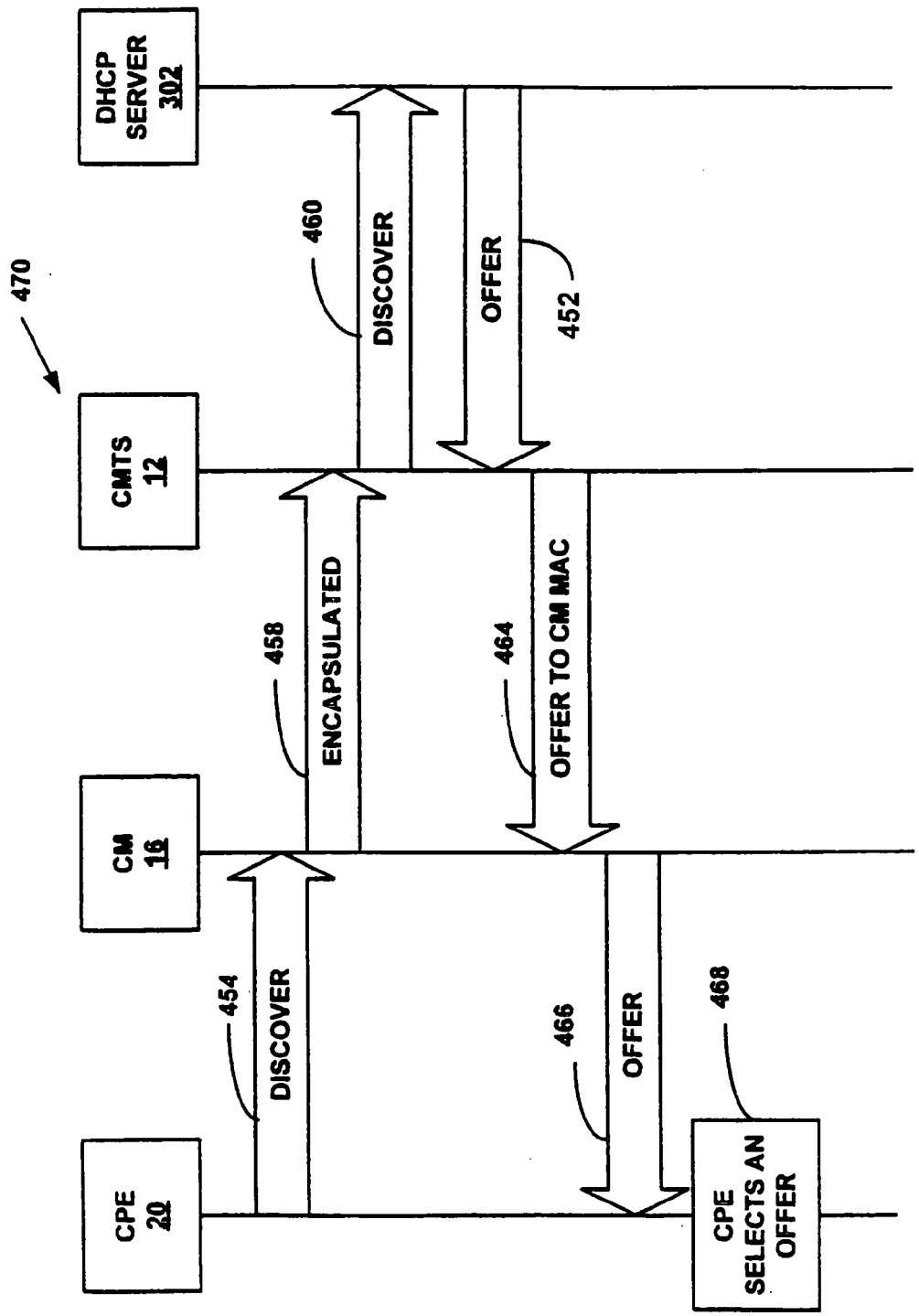
FIG. 13 is a block diagram illustrating a message flow for obtaining addresses for a customer premises equipment entity.

FIG. 13 is an exemplary block diagram illustrating a message flow 470 of the method 450 illustrated in FIG. 12. The message flow 470 illustrates the CPE 18, the CM 18, the CMTS 12, and the DHCP servers 302. FIG. 13 illustrates the steps 454, 458, 460, 462, 464, 466, and 468 of the method 450 shown in FIG. 13.

Figure 14B:
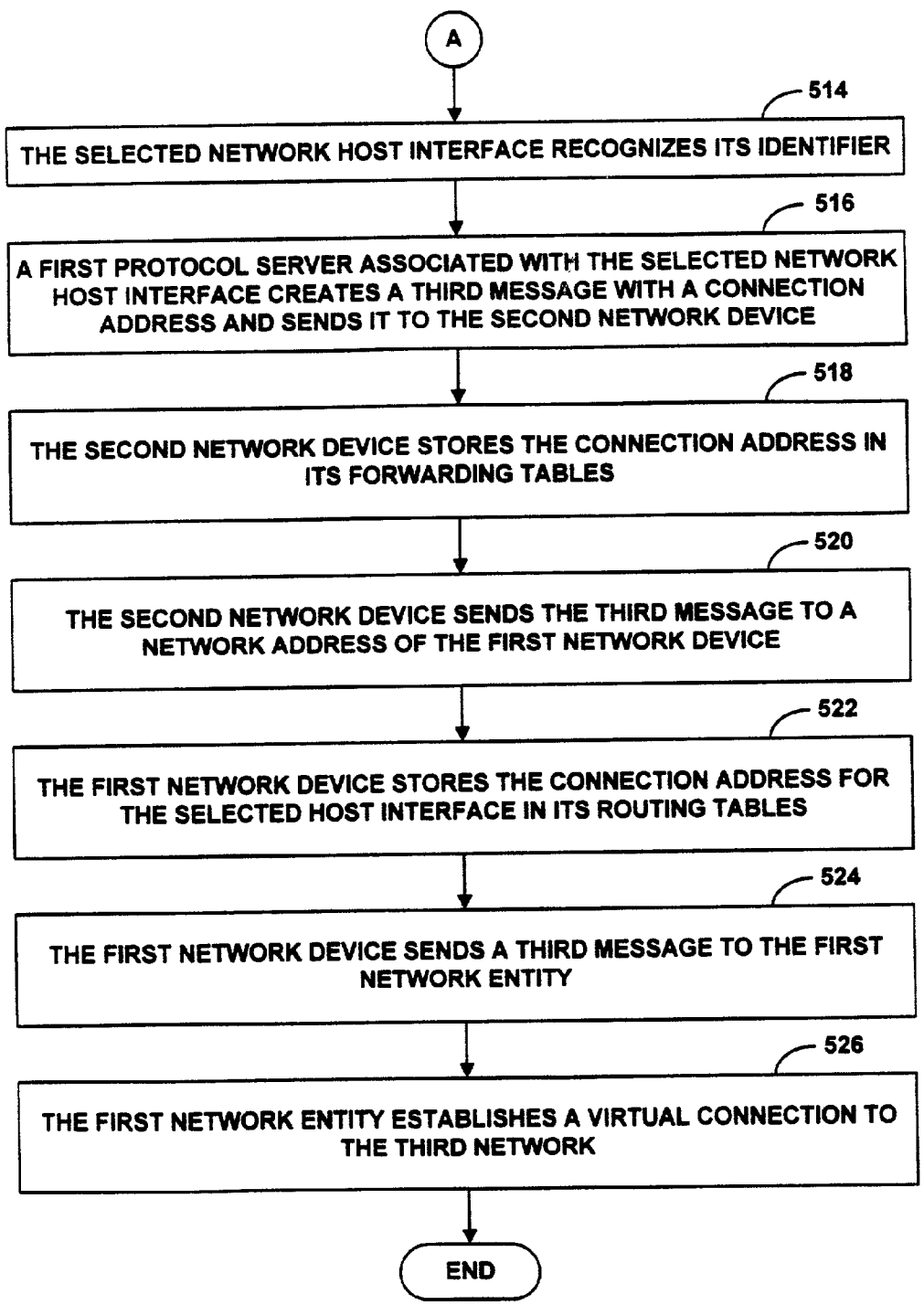

According to an exemplary embodiment, since a network device receives multiple DHCPOFFER messages (step 466 in FIG. 12), the network device resolves and acknowledges one offer from a selected network host interfaces. FIG. 14 is a flow chart illustrating an exemplary method 500 for resolving and acknowledging host addresses in an Ethernet-return data-over-cable system.

At step 502, the first network entity receives one or more first reply messages from one or more network servers associated with network host interfaces. The one or more messages are offers from one or more network servers associated with the network host interfaces. At step 504, the first network entity selects one of the network host interfaces using one of the first reply messages. At step 506, the first network entity creates a second message to accept the offered services from the selected network host interface. In one embodiment, the second message includes an identifier of the selected network host interface.

At step 508, the first network device sends the second message to the first network device. At step 510, the first network device receives the second message from the first network entity, encapsulates the second message into a frame and sends it to the second network device. The payload of the encapsulated message includes a message type, a network address of the first network device, a source IP address and a destination IP address, and the encapsulated second message. In one embodiment, the source IP address may be an IP address of the first network device, and the destination IP address may be an IP address of a downstream connection associated with the second network device. Further, the frame may include source and destination port numbers.

At step 512, when the second network device receives the second message, the second network device forwards the second message to one or more network host interfaces. The network host interfaces may be associated with one or more network servers. At step 514, the selected network host interface recognizes its identifier in the second message. At step 516, a first protocol server associated with the selected network host interface generates a third message and sends it to the second network device. According to an exemplary embodiment, the third message is an acknowledgement message for the first network entity that the selected network host interface received the second message. The third message includes a connection address for the selected network host interface. At step 518, the second network device stores the connection address in its routing tables.

At step 520, the second network device sends the third message to a network address of the first network device. At step 522, the first network device stores the connection address for the selected network host interface in its routing tables. At step 524, the first network device sends the third message to the first network entity. In one embodiment, if a broadcast bit in the third message is set, the first network device sends the third message to a broadcast IP address such as 255.255.255.255. At step 526, the first network entity receives the third message and establishes a virtual connection to a third network.

According to the exemplary embodiment of the method 500, the first network entity is the CPE 18, the first network device is the CM 16, the second network device is the CMTS 12, and the first protocol servers are DHCP servers. Further, the frame format is the UDP format, and the third network is the data network 34. The first reply messages are DHCPOFFER messages, the second message is a DHCPREQUEST message, and the third message is a DHCPACK message. However, the exemplary embodiment, is not limited to these network devices, messages or protocols, and fewer, more, different or equivalent network devices, messages or protocols could also be used.

FIG. 15 is an exemplary block diagram illustrating a message flow 550 of the method 500 illustrated in FIG. 14. The message flow 550 illustrates the CPE 18, the CM 18, the CMTS 12, and the DHCP servers 302. FIG. 15 illustrates the steps 508, 510, 512, 516, 518, 520, 524 and 528 of the method 500 shown in FIG. 14, as well as the steps of the method 450.

When the CM 16 and the CPE 18 establish IP connectivity via a DHCP process, the CM 16 acquires operational parameters. In one embodiment, a DHCPOFFER message typically includes a TFTP server address in the "siaddr" field, a configuration file name in the "file" field and a CM IP address in the "yiaddr" field. To obtain a configuration file, the CM 16 may use the IP address and the configuration file name obtained via the DHCP process to initiate a TFTP exchange with a configuration server having the TFTP server address specified in a DHCPOFFER message. The configuration file may comprise a plurality of configuration parameters, such as Class of Service ("CoS") and Quality of Service ("QoS") configuration parameters. Further, the configuration file may comprise a CM Message Integrity Check ("MIC") and a CMTS Message Integrity Check that may be used by the CM 16 and the CMTS 12 to verify authentication of the configuration file. The MIC is a cryptographic digest that may be calculated using a known or later developed hashing function.

Once the CM 16 receives the configuration parameters from a TFTP server, the CM 16 registers with the CMTS 12. In one embodiment, the CM 16 may use a registration request ("REG-REQ") message to register with the CMTS 12. In one embodiment, when the CMTS 12 receives a REG-REQ message, the CMTS 12 validates the authentication of the message. In one embodiment, the CMTS 12 uses a MIC included in the REG-REQ message. Further, the CMTS 12 allocates CoS identifiers and sends a registration response ("REG-RSP") message to the CM 16. According to an exemplary embodiment, when the CM 16 receives the REG-RSP message from the CMTS 12, the CM 16 is operational.

Address Resolution in the Ethernet-Return Data-Over-Cable

Although every machine on the Internet has one or more IP addresses, the IP addresses cannot be used for sending packets because the data link layer hardware does not understand IP addresses. When a customer premises equipment entity such as the CPE 18 wants to send an IP packet to another customer premises equipment entity on its local network, the IP layer on the CPE 18 first determines whether a hardware address (MAC address) associated with a destination IP address is known. If the hardware address of the destination entity is known, the CPE 18 simply transmits data to the destination entity. However, if the network address of the destination entity is not known, then, the IP layer has to locate it before any data can be sent from the CPE. The IP layer uses the address resolution protocol ("ARP") to map IP network addresses to hardware addresses that are used by the data link protocol.

The term address resolution protocol refers to the process of determining an address of a network device on a network. The address is resolved using a protocol in which a piece of information is sent by a client process that is executed on a local customer premises equipment to a server process that is executed on a remote customer premises equipment entity. The information received by the server process allows the server to uniquely identify the network system for which the address is required, and, therefore, to provide the required address. The address resolution procedure is completed when the local customer premises equipment entity receives a response from the remote customer premises equipment entity, and the response includes the required network address.

The ARP achieves the address resolution by issuing a low-level broadcast message onto a network such as an Ethernet network, for example. The broadcast message that is used to resolve a network address includes an ARP request message. ARP messages include a plurality of fields, five of which are typically used to provide the ARP functionality. The five fields include: a hardware address of a source customer premises equipment entity field, an IP address of the source customer premises equipment entity field, a hardware address of a destination customer premises equipment entity field, a hardware address of the destination premises equipment entity field, and a message type field that indicates the type of the ARP message such as a request or a response.

When a local customer premises equipment entity issues an ARP request message, the local customer premises equipment entity defines three of the four address related fields. Specifically, the local customer premises equipment entity provides its own IP address, an IP address of a destination customer premises equipment entity and specifies a message type to define the message as an ARP request. Once the local customer premises equipment entity creates an ARP request message, the local customer premises equipment entity broadcasts the ARP request message on a local network such as an Ethernet network. Since ARP request messages are broadcast messages, all network devices on the network receive the ARP request messages.

All network devices on a local network should monitor their local network for ARP request broadcasts and, if a network device detects that the ARP request message including a network device's IP address, the network device generates an ARP response message. The ARP response message includes an IP address and a MAC address of the network device (placed into sender fields), as well as an IP address and a MAC address of a network device that initiated the ARP process by sending an ARP request message. The network device also defines the ARP message as the ARP response message. Typically, ARP response messages are not broadcast over the network, but they are unicast directly to original requesters. Thus, when a destination network device generates an ARP response message, the message is unicast to an original requester network device.

Typically, when a requesting customer premises equipment entity receives an ARP response message, the entity may store an address pair of a destination customer premises equipment entity on its local cache. Therefore, when the customer premises equipment entity initiates data transmission, it first checks its local cache, and if an entry of a destination customer premises equipment entity is found in the cache, the customer premises equipment entity may simply use it, eliminating the need to broadcast additional ARP request messages. However, most caches have a limited storage space and, typically, the table entries are overwritten on as needed basis.

Figure 16B:
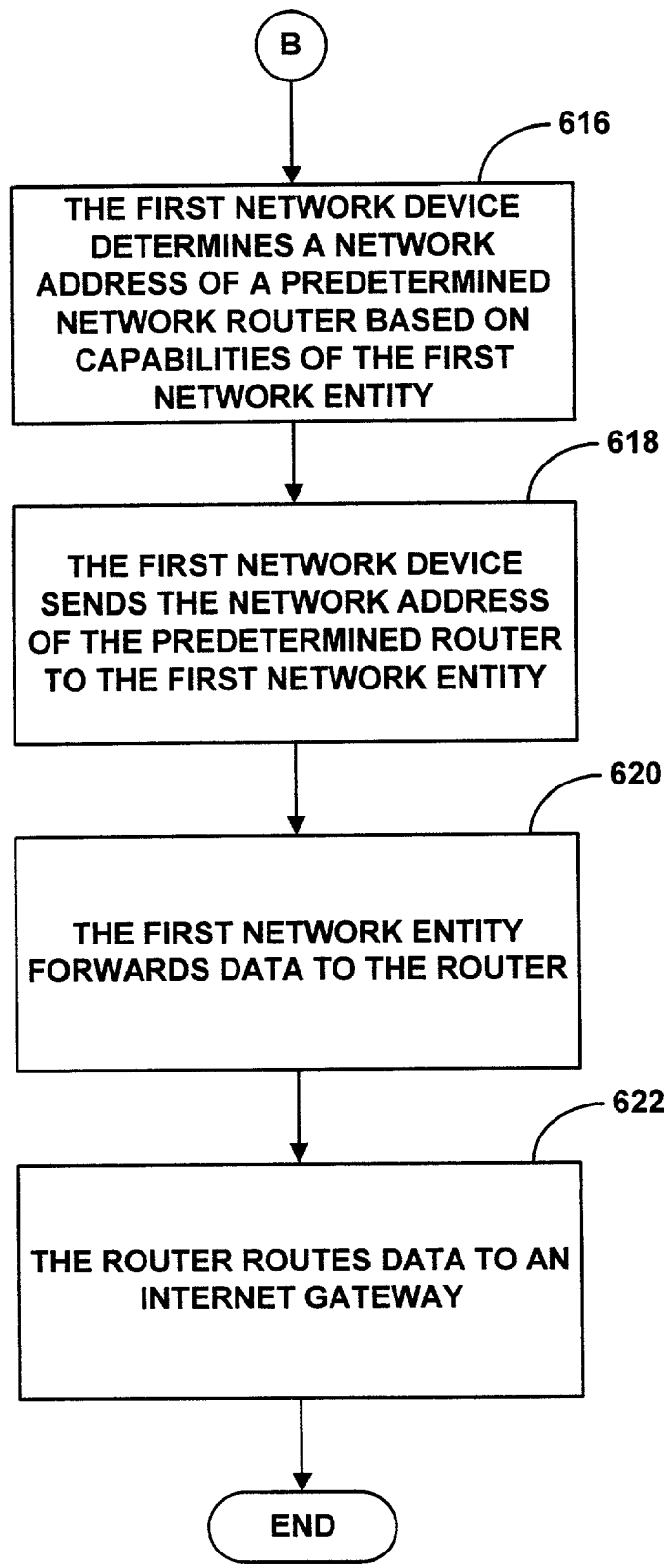

FIGS. 16A and 16B are a flow chart illustrating a method 600 for resolving network addresses on an Ethernet-return data-over-cable system. At step 602, when a first network entity initiates data transmission to a second network entity, the first network entity retrieves an address routing table that may store address pairs associated with a plurality of network entities on a local network. At step 604, the first network entity determines whether an address pair associated with the second network entity exists in the address routing table. If the address pair associated with the second network entity exists in the table, at step 606, the first network entity uses a network address of the second network entity stored in the table to start sending data to the second network entity.

If the address pair associated with the second network entity is not in the table, at step 608, the first network entity generates a second protocol request message and broadcasts the message on the local network. In one embodiment, the second protocol request message is an address resolution request message, and it is broadcast to every network device on the local network. Further, the second protocol request message contains a first protocol address and a network address of the first network entity, and a first protocol address of the second network entity.

At step 610, a first network device receives the second protocol request message, generates a second second-protocol request message and broadcasts the second message on the local network. For example, the second second-protocol request message includes a first protocol address and a network address of the first network device, and the first protocol address of the second network entity.

At step 612, the first network device determines whether the second network entity is on the local network. In one embodiment, the first network device simply waits a predetermined period of time for a second protocol response message from the second network entity. Thus, if the first network device receives the second protocol response message from the second network entity, the first network device may conclude that the second network entity is on the local network. If the second network entity exists on the local network, the second network entity sends second protocol reply messages to the first network device and to the first network entity since those devices sent the second protocol request messages. At step 614, when the first network entity receives a second protocol reply message from the second network entity, the first network entity starts sending data to the second network entity using the network address of the second network entity.

Returning to step 612, if the first network device does not receive a second protocol reply message from the second network entity, at step 616, the first network device determines a network address of a network router for the first network entity. In one embodiment, the first network device receives, in one of the initialization messages, a plurality of network addresses of network routers, and the first network device stores the received addresses. Further, in such an embodiment, each network address may be associated with a predetermined service provider, and the first network device may select a network address for use on the first network entity based on a service provider associated with the first network entity. In one embodiment, prior to sending the second protocol reply message, the first network device determines whether an address pair of the first network entity exists in a routing table on the first network device. If the address pair is not in the routing table, the method 600 terminates.

At step 618, the first network device sends a second protocol reply message to the first network entity. According to an exemplary embodiment, the second protocol reply message from the first network device includes a network address of a network router for the first network entity. At step 620, when the first network entity receives the second protocol response message from the first network device, the first network entity starts sending data to the network router address specified in the second protocol reply message from the first network device. At step 622, the network router invokes its internal routing tables to determine an address pair associated with the next network router. Using that data, the network router forwards data from the first network entity to the next router.

According to an exemplary embodiment associated with the method 650, the first network entity is the CPE 18, the second network entity is a CPE 18', the local network is the Ethernet network 20, the network router is the HRE 28, the next router is an IP router, and the first network device is the CM 16. Further, the second protocol request message is an ARP request message, and the second protocol reply message is an ARP reply message. According to an exemplary embodiment, the first protocol addresses are IP addresses, and the network addresses are MAC addresses. However, the exemplary embodiment is not limited to these network devices or messages, and fewer, more, different or equivalent network devices could also be used.

FIG. 17 is a flow chart illustrating a method 650 for receiving data on a customer premises equipment entity from a data network such as an Internet in an Ethernet-return data-over-cable system. At step 652, a second network entity on a data network transmits data to a first network entity located on a local network. According to an exemplary embodiment, a destination field of data packets from the second network entity includes an IP address of the first network entity and a source field of the data packets includes an IP address of the second network entity. When the second network entity transmits the data packets, a network gateway on the data network receives the data packets and, at step 654, the network gateway determines a routing path for the data packets from the second network entity. In one embodiment, the network gateway determines a routing address so that the data is routed to the first network entity. In one embodiment, the routing address is a network address of a second network device.

At step 656, the second network device receives the data packets forwarded by the network gateway from the second network entity. At step 658, the second network device retrieves its address routing tables to determine a network address of a first network device associated with the first network entity. For example, the second network device may use the IP address of the first network entity to determine the network address of the first network device. Once the second network device determines that the network address of the first network device is in its routing tables, at step 660, the second network device forwards the data packets to the first network device via a downstream connection of a second network.

When the first network device receives the data packets from the second network device, at step 662, the first network device retrieves its routing tables. At step 664, the first network device determines whether an address pair of the first network device exists in the routing tables. If the address pair of the first network entity is in the routing tables, at step 666, the first network device forwards the data packets to a network address of the first network entity on its local network. If the address pair does not exist in the routing tables of the first network device, the method 650 terminates.

According to an exemplary embodiment illustrated in the method 650, the first network device is the CM 16, the first network entity is the CPE 18, the second network device is the CMTS 12, the second network entity is the CPE 18' located on a different network than the CPE 18. Further, the local network is the Ethernet 20, the data network is the data network 34 and the second network is the cable network. Further, the network gateway is a data network gateway such as an Internet gateway.

Address Resolution for Physically and Virtually Distributed Subnets

As the number of distinct local networks grows, creating a new local network can be problematic due to a need for assigning a new network number to each newly created network and, thus, requiring system administrators to reconfigure a configuration file for each device that is moved to the newly created local network. To solve this problem, a network may be split into a number of subnets.

Each host on a network has a network address. A 32-bit network address is usually divided into 4-byte numbers that are typically written in a dotted decimal notation using numbers 0 to 255. For example, if a company starts up with a class B address that allows up to 65,534 hosts on a local network, it may require at a later time a second local area network to accommodate new hosts. Based on the need, the company may, for example, decide to split the 16-bit host number (used by the class B address) into a 6-bit subnet number and a 10-bit host number, thus, allowing 62 separate local area subnets, each with up to 1022 hosts.

Figure 18:
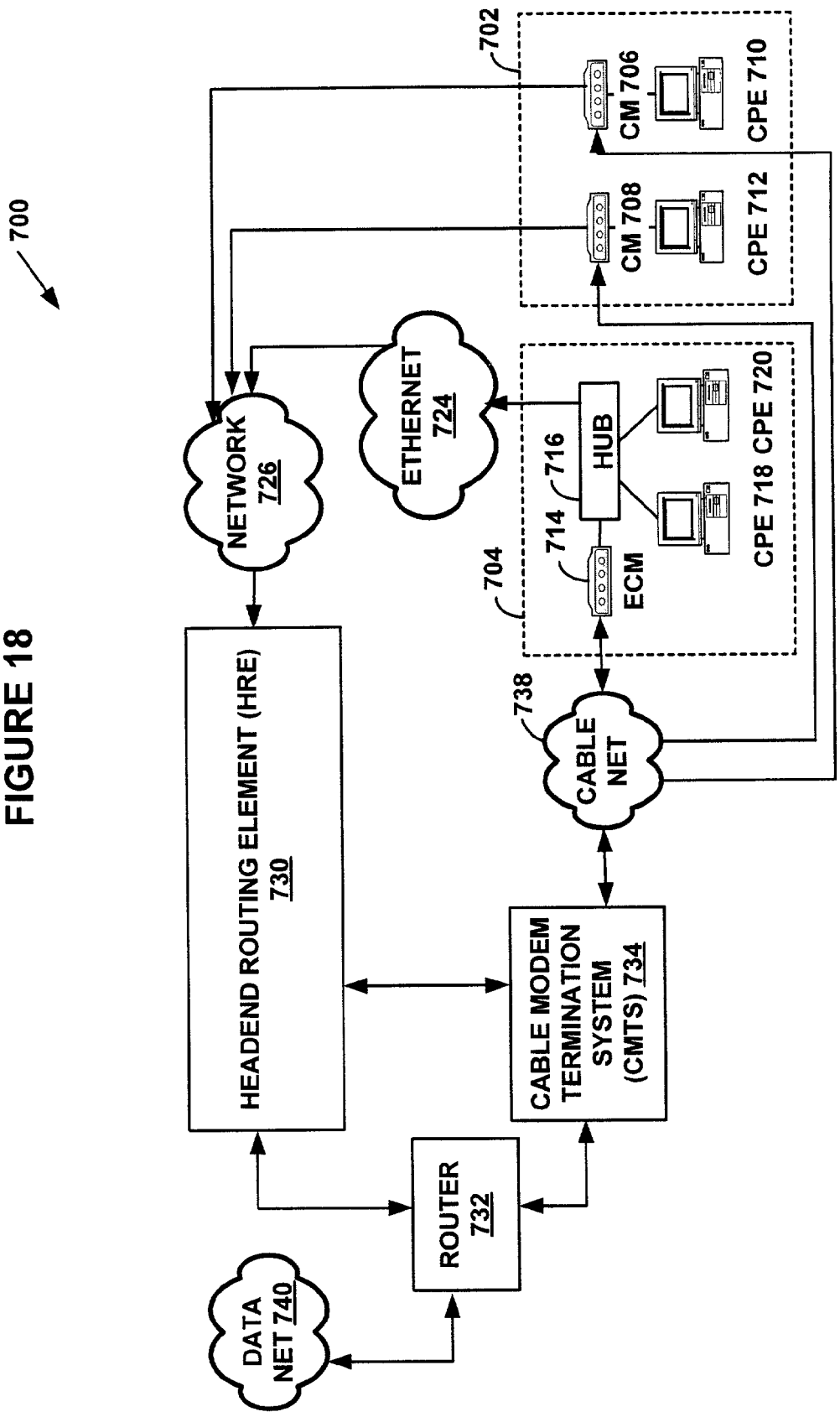
FIG. 18 is a block diagram illustrating a system having a plurality of subnets.

FIG. 18 illustrates an exemplary system 700 including two physically and virtually distributed subnets 702 and 704. The two subnets may be located on the same network or may include a number of distributed elements connected by optical links, routed networks, or Wide Area Network connections, for example. In the system architecture illustrated in FIG. 18, the first subnet 702 includes a CM 706 and CM 708 providing network services to a CPE 710 and CPE 712, respectively.

The network devices on the subnet 702 may use a return path via a network 726. The network 726 represents one or more networks, such as a cable network providing an upstream communication path for network devices on the first subnet 702, or an optical fiber network providing a communication path for network devices on the second subnet 704, or a combination thereof. The second subnet 704 illustrated in FIG. 18 includes an Ethernet Cable Modem (ECM) 714 in communication with a CPE 718 and CPE 720 via a hub 716.

As mentioned in the preceding paragraph, the network devices on the second subnet 704 may use an Ethernet network 724 and the optical fiber network 726 as an upstream return path. As illustrated in FIG. 18, the network 726 is coupled to a headend routing element 730 that may include or may be coupled to a number of switching elements, such as Layer 2 switches, for example. The headend routing element 730 may be collocated at a cable headend with a CMTS 734, or it may be located elsewhere and have routing association with the CMTS 734. Further, the headend routing element 730 and the CMTS 734 are connected to a backbone router/switch 732 that routes data from and to a data network 740 such as a public IP network. In the embodiment illustrated in FIG. 18, data from the data network 740 is forwarded by the router/switch 732 to the CMTS 734 and a cable network 738 that provides a downstream path to network devices on the first and second subnets 704 and 702.

In one embodiment, the network devices on the subnets 702 and 704 may employ subnet gateways including subnet routers for directing packets arriving on the gateway to predetermined devices on the subnets, and a switch for furnishing actual paths in and out of the gateways.

It should be understood that the system 700 illustrated in FIG. 18 depicts a high-level network architecture, in which the present invention may be employed, and more, fewer, different, or equivalent components, connections or interfaces could also be used. Further, the arrangements described herein are shown for purposes of illustration only, and those skilled in the art will appreciate that different arrangements and other elements, whether or not known in the art, could also be used, and some elements may be omitted altogether. Additionally, as in most communication applications, those skilled in the art will appreciate that many of the elements described herein are functional entities that may be implemented as discrete components or in conjunction with other components, in any suitable combination or location.

To accommodate multiple subnets, subnet address "scopes" may be created for each subnet. A subnet address scope may include a network address and a netmask, and may be associated with a number of network addresses of devices on a subnet associated with the subnet address scope. According to one embodiment, a device with monitoring and traffic gating capabilities is configured with a number of traffic gating tables, and the device may proxy ARP requests on conditional basis, based on a subnet associated with a device sending an ARP request. For illustrative purposes only, the first subnet 702 may be associated with a subnet address scope 208.213.136.0 using IP addresses starting at 208.213.136.1. In such an embodiment, the CPE 712 may be associated with an IP address 208.213.136.1 and the CPE 714 may be associated with an IP address 208.213.131.3, for example. The second subnet 704 may be further configured to employ a subnet address scope 208.213.138.0 and use IP addresses starting at 208.213.138.1. In such an embodiment, the CPE 718 may use an IP address 208.213.138.1, and the CPE 720 may use an IP address 208.213.138.2, for example. Further, each CPE has a predetermined MAC address. For example, the CPE 712 may have a MAC address 00-00-86-01-AF-47.

Table 6 illustrates an exemplary subnet address scope with an IP address range for the subnet 702.

TABLE 6

| Subnet address scope (Network address/netmask) | IP address range |
|---|---|
| 208.213.136.0/255.255.255.0 | 208.213.136.1–208.213.136.255 |

As illustrated in Table 6, and mentioned in the preceding paragraph, the first subnet is associated with the subnet address scope having an IP address of 208.213.136.0 and a netmask of 255.255.255.0. The subnet 702 may be associated with an IP address range from 208.213.136.1 to 208.213.136.255.

According to an exemplary embodiment, network address scopes are associated with at least one predetermined networking element having a capability to proxy an ARP requesting device to a specially configured subnet gateway. The association may be based on a type of a service provider providing network services to network devices on a particular subnet so that data from all devices associated with a predetermined service provider may be directed to a predetermined MAC address of a network element such as a router of that service provider.

The tables including network address scopes with predetermined networking elements are configured on network devices within each subnet, such as cable modems on each subnet arranged to ARP proxy ARP requests from CPEs on conditional basis, described below. However, the ARP proxy functionality is not limited to the implementation on a CM, and a different device having monitoring and traffic gating capabilities, according to described exemplary embodiments, could also be used.

In the embodiment where a CM is configured as a monitoring and traffic gating device, the CM is initialized with data of multiple subnets. For example, the CM may receive the subnet information data via a configuration file download or using a Simple Network Management Protocol (SNMP).

In the embodiment, employing a configuration file download to configure a monitoring and traffic gating device, the subnet information may be encoded in a TLV format, for example, and a TLV tuple may include a subnet address scope and a network address of a predetermined network element arranged to proxy ARP requests of CPEs on that subnet. Alternatively, if the SNMP is used, the subnet information may be communicated from a network management console, operated by a system administrator, to a monitoring and traffic gating device.

When a monitoring and traffic gating device receives the subnet information, the device may store the received data in one or more traffic gating tables or ARP tables. For example, some of the ARP tables may include static ARP entries and some may include transient entries (the entries that may be flushed). In one embodiment, to differentiate a static entry from a transient entry, each subnet information assignment record, such as a TLV tuple, may include a predetermined bit that differentiates a static entry from a transient entry so that the traffic gating device is informed which entries may be flushed. Further, a transient entry may be communicated with a predetermined timeout period so that it may be flushed when the timeout period expires.

When the monitoring and traffic gating device proxies an ARP request on conditional basis as will be described below, the device may employ a network matching algorithm to determine a network element to proxy the ARP request for a CPE on a particular subnet. The network matching algorithm may include a first set of instructions for determining an association of a particular source IP address with a predetermined subnet. In one embodiment, the source IP address may be applied to a netmask with a Boolean "AND" operation on a bit-by-bit basis (e.g., 0 AND 0=0, 0 AND 1=0, 1 AND 0=0, 1 AND 1=1). Table 7 illustrates applying the exemplary source IP address of 208.213.136.1 to the subnet netmask of 255.255.255.0.

TABLE 7

| Address/netmask | Bit pattern |
|---|---|
| 208.213.136.1 AND | 11010000 11010101 10001000 00000001 |
| 255.255.255.0 | 11111111 11111111 11111111 00000000 |

TABLE 7-continued

| Address/netmask | Bit pattern |
| --- | --- |
| Result: 208.213.136.0 | 11010000 11010101 10001000 00000000 |

The result from Table 7 may be further applied to a number of subnet address scopes stored on the monitoring/traffic gating device. An example of one such application is illustrated in Table 8. The result from Table 7 is applied to the subnet address scopes using a Boolean exclusive OR (XOR) operation. As is known in the art, a Boolean XOR is also applied on a bit-by-bit basis (e.g. 0 XOR 0=0, 0 XOR 1=1, 1 XOR 0=1, 1 XOR 1=0). If the result of the XOR operation is zero, the result from Table 7 matches a predetermined subnet address scope.

TABLE 8

| Subnet scope | Bit pattern |
| --- | --- |
| Result Table 3 = 208.213.136.0 XOR | 11010000 11010101 10001000 00000000 |
| Subnet scope = 208.213.136.0 | 11010000 11010101 10001000 00000000 |
| Result = 0.0.0.0 | 00000000 00000000 00000000 00000000 |

Thus, the result of zero from Table 8 indicates that the IP address of 208.213.136.1 is within the subnet 208.213.136.0 having the netmask 255.255.255.0, and the monitoring/traffic gating device has routing association for the devices on the subnet 208.213.136.0 to a predetermined network element MAC address that proxies ARP requests for devices on the 208.213.136.0 subnet.

Alternatively, each subnet may be further subneted, and each part of the subnet may be associated with more than one network element. For example, on a first subnet, hosts 0–3 having IP addresses 208.213.136.0–208.213.136.3 and a subnet mask 255.255.255.252 may be associated with a first network element having a network address MAC1, and hosts 4–7 having IP addresses 208.213.136.4–208.213.136.7 and the same subnet mask 255.255.255.252 may be associated with a second network element having a network address MAC2. It should be understood that the IP address assignment is exemplary, and more hosts may be associated with a predetermined network element. Using another example, hosts 0–127 having IP addresses 208.213.136.0–208.213.136.127 and a subnet mask 255.255.255.128 may be associated with the first network element having the network address MAC1, and hosts 128–255 having IP addresses 208.213.136.128–208.213.136.255 may be associated with the second network element having the network address MAC2.

In the last embodiment, a monitoring/traffic gating device may receive a number of TLV tuples defining that hosts 208.213.136.0–208.213.136.127 having the network 255.255.255.128 are associated with a first network element having the MAC1 address, and hosts 208.213.136.128–208.213.136.255 having the network 255.255.255.128 are associated with a second network element having the MAC 2 address.

Further, the monitoring/traffic gating device is not limited to the use of method described in reference to Table 7 and 8, and a different method could also be used to determine a subnet associated with a predetermined source IP address.

Further, if more than one network element is used for network devices on a particular subnet, the monitoring/traffic gating device may load-balance ARP proxy requests between the available network elements. Additionally, if an IP address does not match any of the subnet scopes with the associated subnets, the monitoring/traffic gating device may not proxy an ARP request from a particular client device to one of the available network elements so that unauthorized client devices will not be given an access to subnet gateways.

Figure 19B:
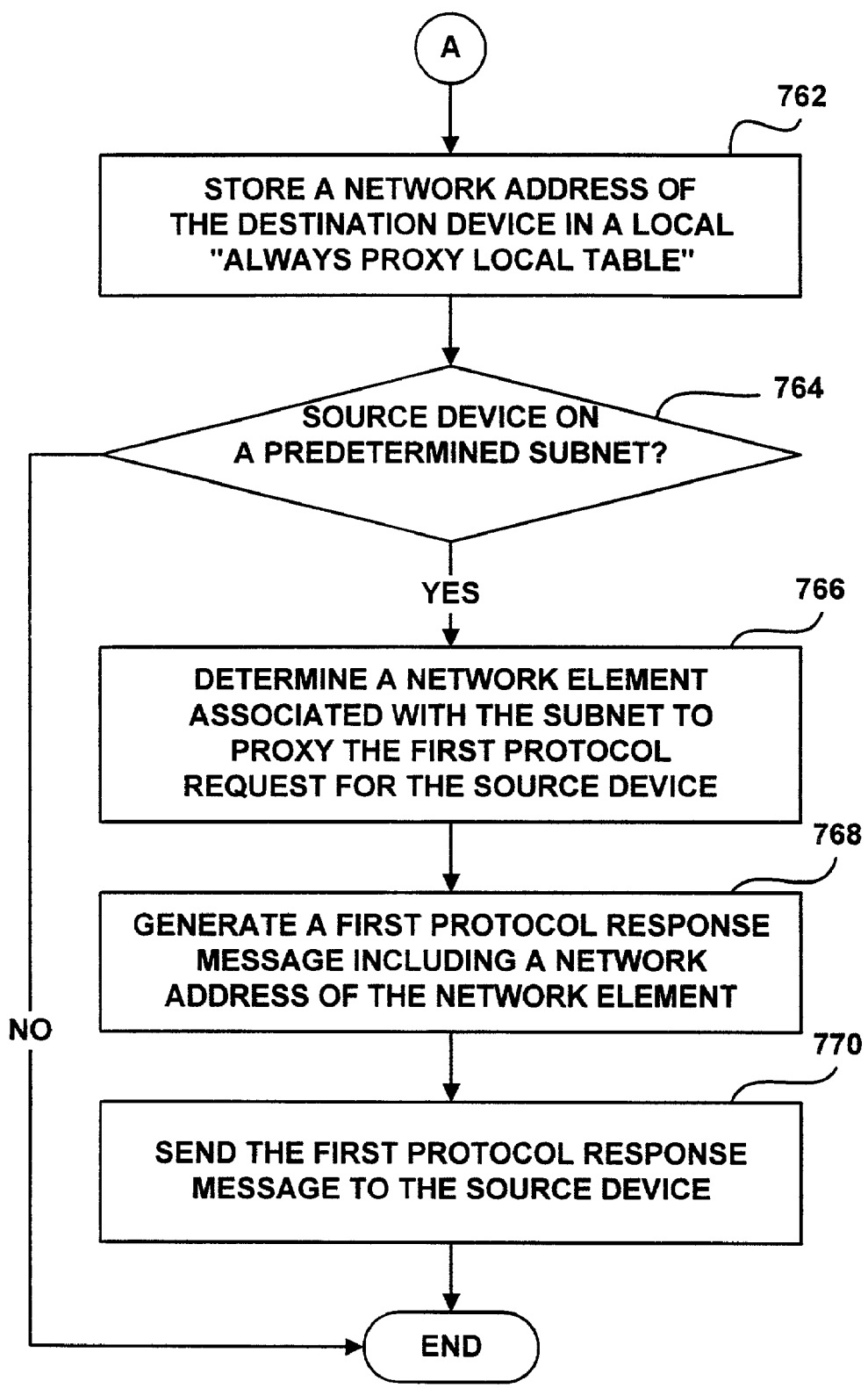

FIGS. 19A and 19B illustrate an exemplary method 750 for resolving network addresses for devices on physically or virtually distributed IP subnets.

Referring to FIG. 19A., at step 752, a broadcast monitoring network device receives a first protocol request message from a source device located on a network.

In an exemplary embodiment, the first protocol request message includes an address resolution protocol request message that is broadcast from the source device on the network. The address resolution request message includes an IP address of the source device, a MAC address of the source device, and an IP address of a destination device.

Upon a receipt of the first protocol request message, at step 754, the broadcast monitoring network device generates a second first protocol request message. The second first protocol request message includes an IP address of the broadcast monitoring network device, a MAC address of the broadcast monitoring network device, and the IP address of the destination device specified in the first protocol request message.

At step 756, the broadcast monitoring network device broadcasts the second first protocol request message on the network. At step 758, the broadcast monitoring network device determines whether a first protocol response message has been received as a response to the second first-protocol request message. If the first protocol response message is received, the broadcast monitoring network device may conclude that the destination device is reachable from the source device, and thus, there is no need to proxy the request to one of the network elements.

If the first protocol response is received on the broadcast monitoring network device, at step 760, the device may add the IP address of the destination device to a "never-proxy local table" including IP addresses reachable from network devices on the local network, and the method 750 terminates.

Referring back to step 758, if the broadcast monitoring network device determines that no response has been received, at step 762, the monitoring device stores the IP address of the destination device in an "always-proxy" local table so that when the device receives a request for that address, it will automatically proxy the request without sending a duplicate request message. In one embodiment, the "always-proxy" local table may be transient so that entries in the table may be flushed after a predetermined configurable timeout period.

Further, if no response is received, at step 764, the broadcast monitoring network device retrieves traffic gating instructions to determine a network subnet associated with the IP address of the source device. For example, the determination may be made using the method described in reference to Table 3 and 4. However, different methods could also be used. If the source device is not associated with any subnet defined in subnet information records on the broadcast monitoring device, the method 750 terminates. Thus, using the method 750, unauthorized network devices may be precluded from accessing subnet gateways.

If the source device matches one of the subnets defined in the subnet information records, at step 766, the broadcast monitoring device determines a network address, such as a MAC address, of a network element arranged to proxy address resolution protocol requests for devices on the subnet determined at step 764. For example, the subnet of the source device may be associated with more than one network element. In such an embodiment, the broadcast monitoring device may select one of the elements using a set of selection rules that may include general time of day rules, load-balancing rules, or round-robin algorithms.

At step 768, the broadcast monitoring device generates a first protocol response message including the network address of the network element determined at step 766. The first protocol response message includes, for example, an address resolution protocol response message. At step 770, the broadcast monitoring network device sends the first protocol response message to the source device.

In the exemplary method 750 and in reference to the system architecture illustrated in FIG. 18, the broadcast monitoring network device functionality may be implemented, for example, on the CM 708 and the ECM 714, the source device may include the CPE 718, and the destination device may include the CPE 712. Further, the network element may include the headend routing element 730. However, it should be understood that the exemplary method 750 is not limited to these network devices, and different network devices could also be used. For example, the traffic monitoring device is not limited to being implemented on the CM, and it could include a standalone network device having the capabilities described in reference to the method 750. Those skilled in the art will appreciate that the method 750 may be applied in combination with many different networking elements.

Figure 20:
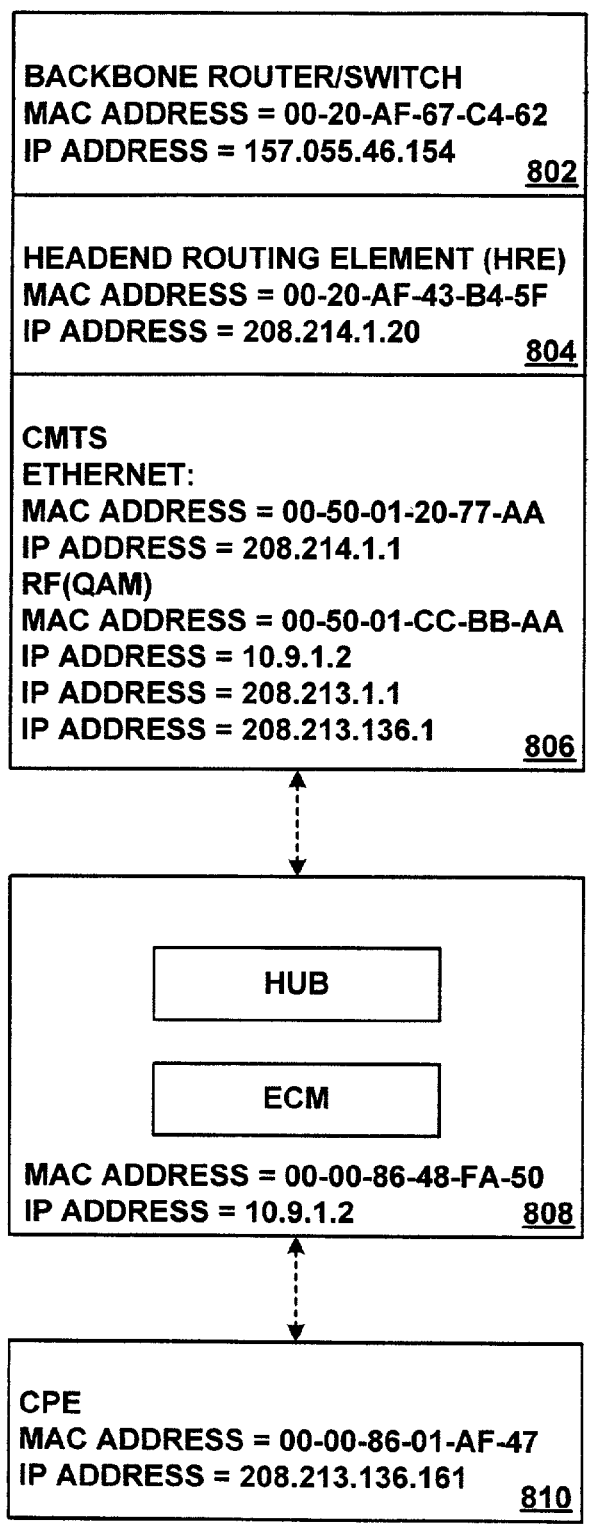
FIG. 20 is a block diagram illustrating exemplary network addresses for each network element in a data-over-cable system.

FIG. 20 illustrates a general system architecture 800 indicating an IP address and a MAC address for each network element. FIG. 20 illustrates a backbone router/switch 802, a headend routing element 804, and a CMTS 806 as one entity; however, it should be understood that those devices may be connected by a number of communication links. The backbone router/switch 802 has an IP address of 157.055.46.154 and a MAC address of 00-20-AF-67-C4-62. The headend routing element 804 has an IP address of 208.214.1.20 and a MAC address of 00-20-AF-43-B4-5F. The CMTS 806 has a pair of Ethernet interface addresses including an IP address of 208.214.1.1 and a MAC address of 00-50-01-20-77-AA, and, further, an RF (QAM) interface including IP addresses of 10.9.1.2, 208.213.1.1, 208.213.136.1, and a MAC address of 00-50-01-CC-BB-AA. The backbone router/switch 802, headend routing element 804 and CMTS 806 communicate with a hub and ECM 808 using various communication links such as cable network connections, Ethernet connection, fiber optic connection, wireless connections, or a combination thereof. The hub and ECM 808 may provide network services to one or more CPEs. FIG. 20 illustrates one such CPE, specifically, a PC 810 having an IP address of 208.213.136.161 and a MAC address of 00-00-86-01-AF-47. The addresses associated with each network entity illustrated in FIG. 20 will be used to illustrate routing of packets in reference to FIGS. 22 and 23. However, it should be understood that the shown addresses are only exemplary addresses, and different address configurations could also be used.

FIG. 21 is a block diagram illustrating a standard ARP message format 820. The ARP message includes a hardware type field 822, a protocol type field 824, a hardware address length ("HLEN") field 826, a high-level protocol address length ("PLEN") field 828, an operation field 830, a source hardware (MAC) address field 832, a source IP address field 834, a destination hardware (MAC) address field 836, and a destination IP address field 838. The hardware type field 822 specifies a hardware interface type such as 1 for an Ethernet interface, the protocol type field 828 specifies a type of high-level protocol, and the operation field 830 specifies a type of the ARP message such as an ARP request (1) and an ARP reply (2).

Figure 22:
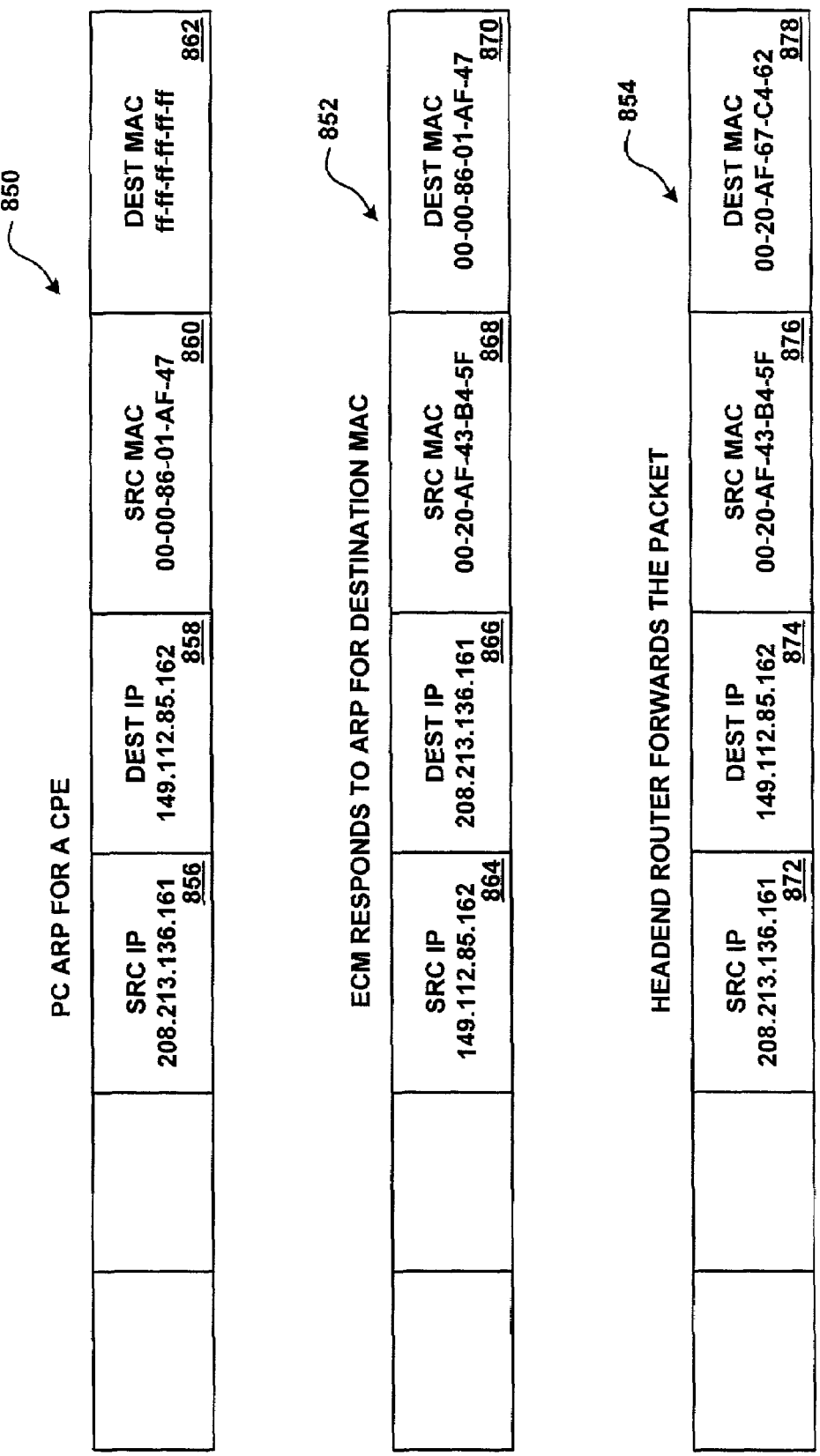
FIG. 22 illustrate block diagrams showing an exemplary set of address resolution protocol messages that may be sent upstream from a host entity.

FIG. 22 illustrates an exemplary routing of a data packet for a CPE, such as the CPE 810 illustrated in FIG. 20 to another CPE. If the CPE 810 does not include a MAC address of a destination CPE in its local cache, the CPE 810 initiates an ARP process. To do that, the CPE 810 sends an ARP request on its subnet. It should be understood that the ARP messages illustrated in FIG. 22 show only source and destination IP and MAC address fields, and a standard ARP message may include additional ARP message fields such as illustrated in FIG. 21, for example. The ARP request 850 includes a source IP field 856 with an IP address of 208.213.136.161 of the CPE 810, a destination IP field 858 with an IP address of 149.112.85.162 of the destination CPE, a source MAC field 860 of 00-00-86-01-AF-47 of the CPE 810 and a destination MAC field 862 with an unknown MAC address.

The CPE 810 broadcasts the packet 850 on its local network. When the ECM 808 detects the ARP request packet 850, the ECM 808 generates a duplicate ARP request message having a destination IP address of the destination CPE specified in the packet 850. When no device responds to the ECM request, the ECM 808 generates an ARP response data packet 852. Prior to the generation of the ARP response 852, the ECM 808 determines a routing entity for routing data from CPEs located on the subnet of the CPE 810. To do that, the ECM 808 first determines a subnet of the CPE 810 and retrieves its configuration records to determine a routing element for the subnet of the CPE 810. In the embodiment illustrated in FIG. 21, the HRE 804 is the network element arranged to provide network services to devices on the subnet of the CPE 810. The exemplary ARP response packet 852 generated on the ECM 808 includes a source IP field 864 including the IP address of 149.112.85.162, a destination address field 866 including an IP address of 208.213.136.161, a source MAC field 868 including a MAC address of 00-20-AF-43-134-5F of the HRE 804, and a destination MAC field including a MAC address of 00-00-86-01-AF-47. When the CPE 810 receives the ARP response packet 852, the CPE 810 forwards packets to the HRE's MAC address of 00-20-AF-43-134-5F. Further, once the HRE 804 receives the data packets from the CPE 810, the HRE routes the packets to a next router (gateway). A packet 854 includes a source IP field 872 including an IP address of 208.213.136.161 of the CPE 810, a destination IP field 874 including an IP address of 149.112.85.162 of the destination CPE, a source MAC field 876 including the MAC address of 00-20-AF-43-B4-5F of the CPE 810, and a destination MAC field 878 including a MAC address of 00-20-AF-67-C4-62 of the router/switch 802. The router/switch 802 may use its internal routing tables to determine a next router or may forward the data packet 854 directly to the destination CPE.

FIG. 23 illustrates an exemplary data packet arrangement for routing a data packet from a CPE located on a subnet other than the subnet associated with the CPE 810. Specifically, FIG. 23 illustrates a scenario where the destination CPE of FIG. 22 responds to the CPE 810. When the destination CPE communicates data back to the CPE 810, the destination CPE of FIG. 21, now a source CPE, generates a data packet 900. Similarly to FIG. 22, it should be understood that the ARP messages illustrated in FIG. 22 show only source and destination IP and MAC address fields, and a standard ARP message may include additional ARP message fields as shown in FIG. 21.

The data packet 900 includes a source IP address field 902 including an IP address of 149.112.85.162, a destination IP address field 904 including a destination IP address of 208.213.136.161 of the CPE 810, a source MAC address field 906 including a MAC address of 00-20-AF-67-C4-62 of the router/switch 802, and a destination MAC address field 908 including a MAC address of 00-50-01-20-77-AA of the CMTS Ethernet 806. The packet 900 includes the MAC address of the CMTS 802 Ethernet side since routing tables on the router/switch 802 include a mapping of the IP address of 208.213.136.161 to the MAC address of the CMTS Ethernet side.

Once the CMTS 802 Ethernet side receives the data packet 900, it forwards it to its RF side and verifies whether the destination IP address 904 is in its routing tables. Once the determination is made, the CMTS 806 modifies the MAC address fields in the received packet 900, thus creating a data packet 930. The data packet 930 includes a source IP address field 910 including the IP address of 149.112.85.162, a destination IP address field 912 including the IP address of 208.213.136.161, a source MAC field 914 including a CMTS MAC interface address such as a 00-50-01-20-77-AA or 00-50-01-CC-BB-AA, and a destination MAC address field 916 including a MAC address of 00-00-86-48-AF-47 of the CPE 810. Once the data packet 930 is generated, the CMTS 806 forwards the packet to the ECM 808.

Upon a receipt of the data packet 930, the ECM 808 verifies whether its local routing tables include the IP address specified in the destination IP field 912 as well as a MAC address associated with that IP address. If the ECM 808 finds the address pair in its local tables, the ECM 808 generates a data packet 940. The data packet 940 includes a source IP address including the IP address of 149.112.85.162, a destination IP address field 920 including the IP address of 208.213.136.161, a source MAC field 922 including a CMTS MAC interface address of 00-50-01-20-50-77-AA or 00-50-01-CC-BB-AA of the CMTS 806, and a destination MAC address field 924 including a MAC address of 00-00-86-01-AF-47 of the CPE 810. Next, the ECM 808 forwards the data packet 940 to the CPE 810 over the local subnet.

FIG. 23 illustrates only address fields and routing the data packets from one routing entity to another. However, it should be understood that each of the illustrated packets includes original data from the source CPE, and more than three address translations may occur on the communication path from the source CPE to the destination CPE.

It should be understood that the programs, processes, methods and systems described herein are not related or limited to any particular type of computer or network system (hardware or software), unless indicated otherwise. Various types of general purpose or specialized computer systems may be used with or perform operations in accordance with the teachings described herein. For example, it could be applied on DSL modems having various return paths, and where network appears to be a LAN to subscriber devices, but other "LAN" elements exist over optical links, routed networks, or WAN connections.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams. While various elements of the preferred embodiments have been described as being implemented in software, in other embodiments in hardware or firmware implementations may alternatively be used, and vice-versa.

It will be apparent to those of ordinary skill in the art that methods involved in the system for providing network address resolution may be embodied in a computer program product that includes a computer usable medium. For example, such as, a computer usable medium can include a readable memory device, such as a hard drive device, CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

We claim:

1. A method for traffic gating in a computer network comprising a plurality of distributed subnets, the method comprising:

receiving a first protocol message on a broadcast monitoring network device from a first network device, the first protocol request message comprising an address resolution request for a second network device;

generating a second first protocol message on the broadcast monitoring network device, the second first protocol request message comprising a second address resolution request for the second network device;

sending the second first protocol message from the broadcast monitoring network device;

determining whether a response message to the second first protocol message is received on the broadcast monitoring network device; if not, determining a network subnet associated with the first network device;

determining a network address of a network element arranged to provide traffic gating to network devices on the network subnet associated with the first network device;

generating a first protocol reply message on the broadcast monitoring network device, the first protocol reply message comprising the network address of the network element arranged to provide traffic gating to the first network device; and sending the first protocol reply message from the broadcast monitoring network device to the first network device.

2. A computer readable medium having stored therein instructions for causing a processor to execute the method of claim 1.

3. The method of claim 1, wherein the first network device comprises a source customer premises equipment entity, the second network device comprises a destination customer premises equipment entity, the broadcast monitoring network entity comprises a cable modem, the network element comprises a network router.

4. The method of claim 1, wherein the first network device comprises a source customer premises equipment entity, the second network device comprises a destination customer premises network entity, the broadcast monitoring network entity comprises a digital subscriber line modem, and the network element comprises a network router.

5. The method of claim 1, further comprising, prior to receiving the first protocol request message, initializing the broadcast monitoring network device with a plurality of subnets, each subnet associated with at least one network element arranged to provide traffic gating to network devices on each subnet.

6. The method of claim 5, wherein the broadcast monitoring network device is initialized using a configuration file download.

7. The method of claim 5, wherein the broadcast monitoring network device is initialized using a Simple Network Management Protocol (SNMP).

8. The method of claim 1, wherein if the first protocol response message is received on the broadcast monitoring network device, updating a local table of network addresses of network device not to proxy for with a network device of the second network device.

9. A method for traffic gating in a computer network comprising a plurality of subnets, the method comprising:
   receiving a plurality of subnet initialization records on a broadcast monitoring network entity, each subnet initialization record comprising a subnet identifier and at least one second protocol network address of at least one network element arrange to provide gating services for network devices on a subnet associated with the subnet identifier;
   receiving a first address resolution protocol request message on the broadcast monitoring network entity from a first network device, the first address resolution protocol request comprising a request for a second protocol network address of a second network device;
   generating a second address resolution request message on the broadcast monitoring network entity, the second address resolution request message comprising a request for the second protocol network address of the second network device;
   sending the second address resolution request message from the broadcast monitoring network entity;
   determining whether an address resolution protocol reply message to the second address resolution request message from the second network device is received on the broadcast monitoring network entity; if not
   determining whether the first network device is in a local routing table on the broadcast monitoring network entity; if so,
   determining a network subnet associated with the first network device using a first protocol network address of the first network device;
   determining a second protocol network address of a network element associated with the network subnet of the first network device and arranged to provide traffic gating services to network devices on the network subnet; and
   sending an address resolution protocol reply message to the first network device, the address resolution protocol reply message comprising the second protocol network address of the network element.

10. A computer readable medium having stored therein instructions for causing a processor to executed the method of claim 9.

11. The method of claim 9, wherein the step of receiving the plurality of subnet initialization records comprises receiving a configuration file during an initialization process, the configuration file comprising the plurality of subnet initialization records encoded in a Type Length Value (TLV) format.

12. The method of claim 9, wherein the step of receiving the plurality of subnet initialization records comprises receiving the records using a Simple Network Management Protocol (SNMP).

13. The method of claim 9, wherein the first protocol addresses comprise Internet Protocol (IP) addresses, and the second protocol addresses comprise hardware (MAC) addresses.

14. The method of claim 9, wherein the first network device comprises a source customer premises equipment entity, the second network device comprises a destination customer premises equipment entity, the broadcast monitoring network element comprises a cable modem, and the network element comprises a network router.

15. The method of claim 9, wherein the plurality of subnet initialization records comprise a plurality of static records and a plurality of transient records.

16. The method of claim 15, further comprising:
   storing the plurality of static records in a static traffic gating table on the broadcast monitoring network device; and
   storing the plurality of transient records in a transient traffic gating table on the broadcast monitoring network device.

17. A broadcast monitoring device on a network subnet comprising:
   at least one traffic gating table comprising a plurality of subnet initialization records, each subnet initialization record comprising a subnet identifier and at least one physical network address of a network entity arranged to provide traffic gating to network devices on a subnet associated with the subnet identifier;
   a first set of instructions implemented to generate a second address resolution protocol request upon receiving a first address resolution request message on the broadcast monitoring device from a first network device, the first request message and the second request message comprising a request for a physical address of a second network device;
   a second set of instructions implemented to determine whether an address resolution response form the second network device is received on the broadcast monitoring device responsive to the second request message sent from the broadcast monitoring device;
   a third set of instructions implemented to determine a subnet of the first network device using a network address of the first network device and further to determine a physical network address of a network element to provide traffic gating for the first network device using the plurality of subnet initialization records based on the subnet associated with the first network device; and
   a fourth set of instructions implemented to generate an address resolution protocol response message comprising the physical network address of the network element arranged to provide traffic gating for the first network device, and to send the address resolution protocol reply message to the first network device.

18. The broadcast monitoring device of claim 17, wherein the broadcast monitoring device comprises a cable modem.

19. The broadcast monitoring device of claim 17, wherein the broadcast monitoring device comprises a Digital Subscriber Line (DSL) modem.

20. The broadcast monitoring device of claim 17, wherein the plurality of subnet initialization records are received in a configuration file.

21. The broadcast monitoring device of claim 17, wherein the plurality of subnet initialization records are received using a Simple Network Management Protocol (SNMP).

22. The broadcast monitoring device of claim 17, further comprising:
 a routing table comprising a plurality of address records of network devices on the network address, each record comprising a physical network address, each record comprising a physical network address and a network address of each device.

23. The broadcast monitoring device of claim 22, wherein the broadcast monitoring device uses the routing table to determine whether a network address of the first network device is in the routing table, and if so, the broadcast monitoring device invoking the third set of instructions for determining the subnet of the first network device.

24. The broadcast monitoring device of claim 17, wherein the first network device comprises a source customer premises equipment entity and the second network device comprises a destination customer premises equipment entity.

* * * * *